US012782674B2

(12) United States Patent
Mori et al.

(10) Patent No.: US 12,782,674 B2
(45) Date of Patent: Nov. 3, 2026

(54) LENS DEVICE

(71) Applicant: FUJIFILM Corporation, Tokyo (JP)

(72) Inventors: Yasuhiro Mori, Saitama (JP); Hajime Fukushima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 230 days.

(21) Appl. No.: 18/603,115

(22) Filed: Mar. 12, 2024

(65) Prior Publication Data

US 2024/0329359 A1 Oct. 3, 2024

(30) Foreign Application Priority Data

Mar. 28, 2023 (JP) ................................ 2023-052138

(51) Int. Cl.
*G02B 7/08* (2021.01)

(52) U.S. Cl.
CPC ..................................... *G02B 7/08* (2013.01)

(58) Field of Classification Search
None
See application file for complete search history.

(56) References Cited

U.S. PATENT DOCUMENTS

| | | | | |
|---|---|---|---|---|
| 2012/0093495 A1 * | 4/2012 | Iwasaki | G03B 3/10 | 396/85 |
| 2013/0003200 A1 * | 1/2013 | Fahlbusch | G02B 7/102 | 359/822 |

FOREIGN PATENT DOCUMENTS

| | | |
|---|---|---|
| JP | 2010-044166 A | 2/2010 |
| JP | 2013-025081 A | 2/2013 |
| JP | 2021196581 A * | 12/2021 |

* cited by examiner

*Primary Examiner* — Ryan Crockett
(74) *Attorney, Agent, or Firm* — Studebaker Brackett PLLC

(57) ABSTRACT

A lens device includes a lens barrel, a lens frame that is supported to be movable with respect to the lens barrel in an optical axis direction, a drive mechanism that moves the lens frame, a first permanent magnet member that is provided on the lens frame, a second permanent magnet member that is provided at a first end part of the lens barrel in the optical axis direction, and a third permanent magnet member that is provided at a second end part of the lens barrel in the optical axis direction.

24 Claims, 15 Drawing Sheets

LENS DEVICE

CROSS-REFERENCE TO RELATED APPLICATIONS

This application claims priority under 35 USC 119 from Japanese Patent Application No. 2023-052138 filed on Mar. 28, 2023, the disclosure of which is incorporated by reference herein.

BACKGROUND OF THE INVENTION

1. Field of the Invention

The technology of the present disclosure relates to a lens device.

2. Description of the Related Art

JP2021-196581A discloses a lens unit comprising an actuator for driving an optical component. The lens unit includes a lens barrel, a movable portion, a guide mechanism, the actuator, a controller, and a buffering mechanism. The movable portion is disposed inside the lens barrel, and the optical component is attached to the movable portion. The guide mechanism movably supports the movable portion. The actuator comprises a drive magnet and a drive coil, and drives the movable portion supported by the guide mechanism. The controller drives the movable portion by controlling a current flowing through the drive coil. The buffering mechanism alleviates collision of the movable portion with a movable end due to movement of the movable portion by a gravitational force in a case where the current supplied from the controller is stopped. The buffering mechanism is operated by a current generated by the drive coil in a case where the movable portion is moved by the gravitational force.

JP2010-044166A discloses a lens barrel comprising at least one lens unit, a guide shaft, and a lens unit drive unit. The lens unit is provided inside a tubular lens barrel body on which light is incident from one end side, and is movable with respect to the lens barrel body. The guide shaft is fixed to the lens barrel body and guides the lens unit in a movement direction of the lens unit. The lens unit drive unit drives the lens unit along the guide shaft. The guide shaft is provided with a collision prevention member that prevents collision between a fixing member that fixes the guide shaft to the lens barrel body and the lens unit.

JP2013-025081A discloses a lens barrel comprising a fixing portion, a drive magnet, and a movement portion. The drive magnet is fixed to the fixing portion. The movement portion holds a lens and is provided with a drive coil, and moves relative to the fixing portion by a driving force generated by an electric field generated in the drive coil and a magnetic field of the drive magnet. One of a locking magnet, or a magnetic body that attracts the locking magnet and an unlocking coil wound around the magnetic body is disposed in the fixing portion. The other of the locking magnet, or the magnetic body and the unlocking coil is disposed in the movement portion. A position of the movement portion relative to the fixing portion can be positioned at a locked position where the locking magnet and the magnetic body are attracted, and at an unlocked position where a distance to the fixing portion is greater than in the locked position and the lock is released.

SUMMARY OF THE INVENTION

One embodiment according to the technology of the present disclosure provides a lens device, for example, capable of suppressing or avoiding collision of a lens frame with a lens barrel upon moving in an optical axis direction.

According to a first aspect of the technology of the present disclosure, there is provided a lens device comprising: a lens barrel; a lens frame that is supported to be movable with respect to the lens barrel in an optical axis direction; a drive mechanism that moves the lens frame; a first permanent magnet member that is provided on the lens frame; a second permanent magnet member that is provided at a first end part of the lens barrel in the optical axis direction; and a third permanent magnet member that is provided at a second end part of the lens barrel in the optical axis direction.

According to a second aspect of the technology of the present disclosure, in the lens device according to the first aspect, the first permanent magnet member has a first pole receiving a repulsive force from the second permanent magnet member and a second pole receiving a repulsive force from the third permanent magnet member.

According to a third aspect of the technology of the present disclosure, in the lens device according to the first or second aspect, the first end part is a part facing the first permanent magnet member in a case where the lens frame is moved to a first movable end part, and the second end part is a part facing the first permanent magnet member in a case where the lens frame is moved to a second movable end part.

According to a fourth aspect of the technology of the present disclosure, in the lens device according to any one of the first to third aspects, a first contact portion that is provided on the lens frame, and a second contact portion that is provided at the first end part and comes into contact with the first contact portion are further provided.

According to a fifth aspect of the technology of the present disclosure, in the lens device according to the fourth aspect, the second contact portion is disposed at a position where the second contact portion comes into contact with the first contact portion before the first permanent magnet member and the second permanent magnet member come into contact with each other in a case where the lens frame is moved in a direction of the first end part.

According to a sixth aspect of the technology of the present disclosure, in the lens device according to the fourth or fifth aspect, the first end part is a part facing the first permanent magnet member in a case where the lens frame is moved to the first movable end part, and the first contact portion and the second contact portion are disposed between the first movable end part and the first end part.

According to a seventh aspect of the technology of the present disclosure, in the lens device according to any one of the fourth to sixth aspects, the first contact portion is provided at a part of the lens frame that is different from a part where the first permanent magnet member is provided, and the second contact portion is provided at a part of the first end part that is different from a part where the second permanent magnet member is provided.

According to an eighth aspect of the technology of the present disclosure, in the lens device according to any one of the fourth to sixth aspects, the first contact portion is provided on the first permanent magnet member, and the second contact portion is provided on the second permanent magnet member.

According to a ninth aspect of the technology of the present disclosure, in the lens device according to any one of the fourth to eighth aspects, at least one of the first contact portion or the second contact portion includes a buffering member.

According to a tenth aspect of the technology of the present disclosure, in the lens device according to any one of the first to ninth aspects, a third contact portion that is provided on the lens frame, and a fourth contact portion that is provided at the second end part and comes into contact with the third contact portion are further provided.

According to an eleventh aspect of the technology of the present disclosure, in the lens device according to the tenth aspect, the fourth contact portion is disposed at a position where the fourth contact portion comes into contact with the third contact portion before the first permanent magnet member and the third permanent magnet member come into contact with each other in a case where the lens frame is moved in a direction of the second end part.

According to a twelfth aspect of the technology of the present disclosure, in the lens device according to the tenth or eleventh aspect, the third contact portion is provided at a part of the lens frame that is different from a part where the first permanent magnet member is provided, and the fourth contact portion is provided at a part of the second end part that is different from a part where the third permanent magnet member is provided.

According to a thirteenth aspect of the technology of the present disclosure, in the lens device according to the tenth or eleventh aspect, the third contact portion is provided on the first permanent magnet member, and the fourth contact portion is provided on the third permanent magnet member.

According to a fourteenth aspect of the technology of the present disclosure, in the lens device according to any one of the tenth to thirteenth aspects, at least one of the third contact portion or the fourth contact portion includes a buffering member.

According to a fifteenth aspect of the technology of the present disclosure, in the lens device according to any one of the first to fourteenth aspects, in a case where the lens device is divided into a first region and a second region in a radial direction of the lens barrel as viewed from the optical axis direction, a sensor that detects a position of the lens frame is disposed in the first region, and the first permanent magnet member, the second permanent magnet member, and the third permanent magnet member are disposed in the second region.

According to a sixteenth aspect of the technology of the present disclosure, in the lens device according to the fifteenth aspect, the drive mechanism includes a first drive mechanism, and a second drive mechanism disposed on a side opposite to the first drive mechanism as viewed from the optical axis direction, and the first region and the second region are regions divided by a line connecting the first drive mechanism and the second drive mechanism as viewed from the optical axis direction.

According to a seventeenth aspect of the technology of the present disclosure, in the lens device according to any one of the first to sixteenth aspects, in a case where a first work amount that is a work amount by a repulsive force of the second permanent magnet member or the third permanent magnet member is denoted by W1, and a second work amount that is a work amount by a gravitational force acting on the lens frame is denoted by W2, $0.5 \leq W1/W2 \leq 1.5$ is satisfied.

According to an eighteenth aspect of the technology of the present disclosure, in the lens device according to any one of the first to sixteenth aspects, the second permanent magnet member and/or the third permanent magnet member is inclined with respect to the optical axis direction as viewed from a cross direction with respect to the optical axis direction.

According to a nineteenth aspect of the technology of the present disclosure, in the lens device according to the eighteenth aspect, the second permanent magnet member and/or the third permanent magnet member is disposed at a different radial position of the lens barrel with respect to the first permanent magnet member as viewed from the cross direction.

According to a twentieth aspect of the technology of the present disclosure, in the lens device according to any one of the eighteenth or nineteenth aspect, an inclination angle of the second permanent magnet member and/or the third permanent magnet member with respect to the optical axis direction is 45 degrees or more and less than 90 degrees.

According to a twenty-first aspect of the technology of the present disclosure, in the lens device according to any one of the eighteenth to twentieth aspects, the second permanent magnet member and/or the third permanent magnet member is inclined with respect to the optical axis direction at an inclination angle at which a first repulsive force component in the optical axis direction and a second repulsive force component in a radial direction of the lens barrel are generated with respect to the first permanent magnet member.

According to a twenty-second aspect of the technology of the present disclosure, in the lens device according to any one of the first to twentieth aspects, the first permanent magnet member and the second permanent magnet member are disposed in orientations facing each other in a radial direction of the lens barrel, and the first permanent magnet member and the third permanent magnet member are disposed in orientations facing each other in the radial direction.

DESCRIPTION OF THE PREFERRED EMBODIMENTS

Hereinafter, an embodiment of the present disclosure will be described with reference to the drawings.

Figure 1:
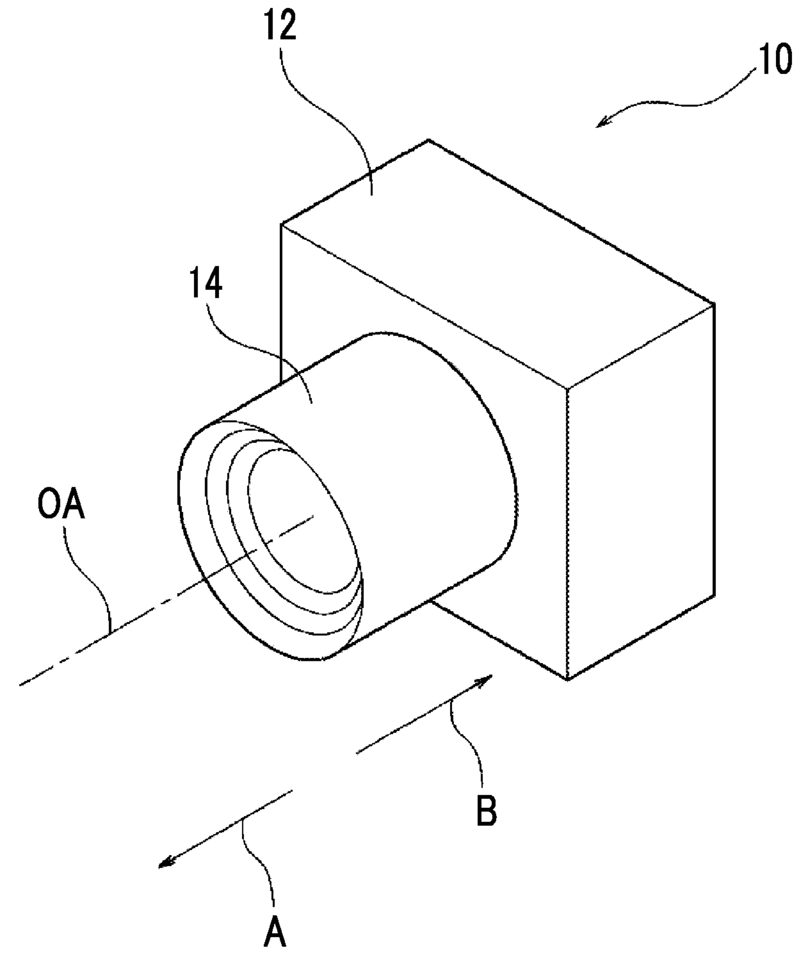
FIG. 1 is a perspective view of an imaging apparatus comprising a lens device according to an embodiment of the technology of the present disclosure.

FIG. 1 is a perspective view of an imaging apparatus 10 comprising a lens device 14 according to the present embodiment. As shown in FIG. 1, the imaging apparatus 10 comprises an imaging apparatus body 12 and the lens device 14. The imaging apparatus 10 is, as an example, a mirrorless camera. The imaging apparatus 10 may be various cameras other than the mirrorless camera. An image sensor or the like (not shown) is provided inside the imaging apparatus body 12. The lens device 14 is a device for forming an image of light on a light-receiving surface of the image sensor and is attached to a front surface of the imaging apparatus body 12. An optical axis OA is an optical axis of the lens device 14. An arrow A side indicates an object side, and an arrow B side indicates an image formation side.

Figure 2:
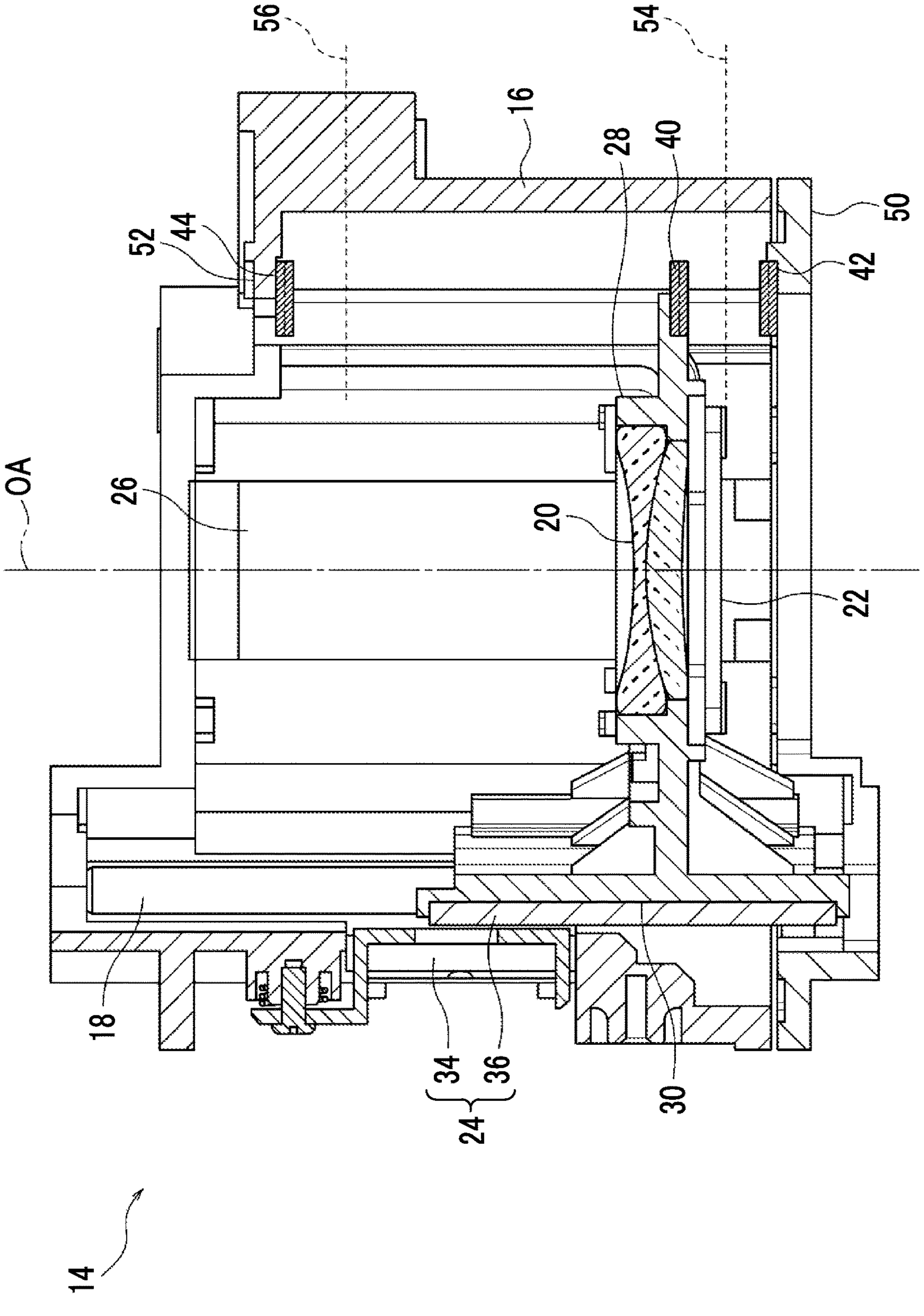
FIG. 2 is a longitudinal sectional view of the lens device.

FIG. 2 is a longitudinal sectional view of the lens device 14. As shown in FIG. 2, the lens device 14 comprises a lens barrel 16, a shaft member 18, a lens 20, a lens frame 22, a sensor 24, and a drive mechanism 26. The lens barrel 16 is formed in a cylindrical shape. The term "cylindrical" as used herein means a concept including a shape of a cylindrical body having irregularities or the like. The shaft member 18 is formed in a rod-like shape and extends in a direction of the optical axis OA (hereinafter, referred to as an "optical axis direction"). The shaft member 18 is disposed at a position on a radially outward side of the lens barrel 16 with respect to the lens 20.

The lens 20 is disposed on the optical axis OA. The lens 20 is, for example, a focus lens or a zoom lens. The lens frame 22 includes a holding portion 28 and a movement portion 30. The holding portion 28 is formed in a frame shape and holds the lens 20. The movement portion 30 is provided in a side part of the holding portion 28. The movement portion 30 is supported to be movable in the optical axis direction by the shaft member 18. Consequently, the lens frame 22 is supported to be movable in the optical axis direction with respect to the lens barrel 16.

The sensor 24 is a sensor that detects a position of the lens frame 22 in the optical axis direction. The sensor 24 is disposed at a position on the radially outward side of the lens barrel 16 with respect to the lens 20. As an example, the sensor 24 is disposed on the same side as the shaft member 18. As an example, the sensor 24 includes a magnetic detector 34 and a magnet 36. The magnetic detector 34 is provided in the lens barrel 16, and the magnet 36 is provided in the movement portion 30 of the lens frame 22. In a case where the magnet 36 is moved with the movement of the lens frame 22 with respect to the magnetic detector 34, a change in a magnetic field due to the movement of the magnet 36 is detected by the magnetic detector 34, and a signal corresponding to the detected change in the magnetic field (that is, a signal corresponding to the position of the lens frame 22) is output from the magnetic detector 34.

The drive mechanism 26 is a mechanism that moves the lens frame 22 in the optical axis direction. As an example, a voice coil motor (VCM) is used as the actuator of the drive mechanism 26. The VCM includes a stator and a mover (both not shown). The stator includes a magnet, and the mover includes a winding, a yoke, and the like. In a case where the winding is energized, a repulsive force is generated between the stator and the mover, whereby the mover moves with respect to the stator. A gap is provided between the mover and the stator, and the mover is allowed to move with respect to the stator in a state where the winding is not energized. The stator is fixed to the lens barrel 16, and the mover is fixed to the lens frame 22. Therefore, in a case where the VCM is in a non-energized state, the lens frame 22 is allowed to move.

Here, the VCM is described as an example of the actuator of the drive mechanism 26, but an actuator that allows the lens frame 22 to move in a case where the actuator is in a non-energized state may be used in addition to the VCM. Hereinafter, a case where the VCM is used as the actuator will be described as an example.

In this way, in a case where the lens frame 22 is allowed to move in a case where the VCM is in a non-energized state, for example, in a case where the imaging apparatus 10 is tilted forward and backward, the lens frame 22 may be moved by its own weight, and the lens frame 22 may collide with the lens barrel 16, which may cause an impact and/or a collision sound. In a case where the impact and/or the collision sound occurs, a user who uses the imaging apparatus 10 may feel uncomfortable.

In that respect, the lens device 14 according to the present embodiment comprises a first permanent magnet member 40, a second permanent magnet member 42, and a third permanent magnet member 44 in order to suppress the occurrence of the impact and/or the collision sound.

Figure 3:
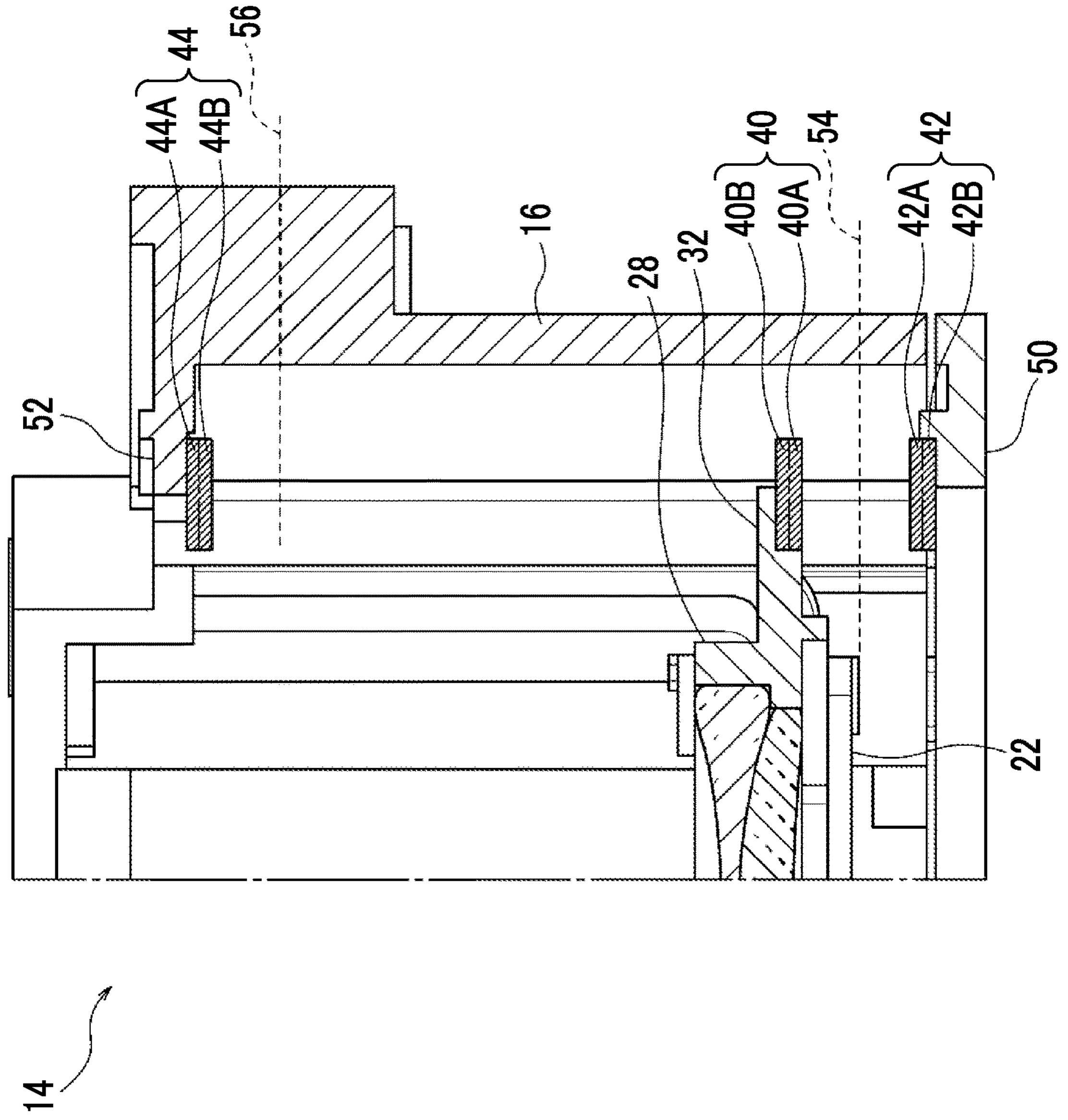
FIG. 3 is a longitudinal sectional view of the lens device on a side on which a first permanent magnet member, a second permanent magnet member, and a third permanent magnet member are provided.

FIG. 3 is a longitudinal sectional view of the lens device 14 on a side where the first permanent magnet member 40, the second permanent magnet member 42, and the third permanent magnet member 44 are provided. An extending portion 32 that extends from the holding portion 28 toward the radially outward side of the lens barrel 16 is formed on the lens frame 22. The extending portion 32 extends toward a side opposite to the shaft member 18 and the sensor 24 (see FIG. 2). The first permanent magnet member 40 is provided on the extending portion 32. The second permanent magnet member 42 is provided at a first end part 50 of the lens barrel 16 in the optical axis direction, and the third permanent magnet member 44 is provided at a second end part 52 of the lens barrel 16 in the optical axis direction.

The first end part 50 is a part facing the first permanent magnet member 40 in a case where the lens frame 22 is moved to a first movable end part 54, and the second end part 52 is a part facing the first permanent magnet member 40 in a case where the lens frame 22 is moved to a second movable end part 56. In FIGS. 2 and 3, a state where the lens frame 22 is located at the first movable end part 54 is shown. The first movable end part 54 and the second movable end part 56 will be described below. As an example, the first end part 50 is a wall part of the lens barrel 16 on the object side, and the second end part 52 is a wall part of the lens barrel 16 on the image formation side.

The first permanent magnet member 40, the second permanent magnet member 42, and the third permanent magnet member 44 are all disposed at positions on the radially outward side of the lens barrel 16 with respect to the lens 20. As an example, the first permanent magnet member 40, the second permanent magnet member 42, and the third permanent magnet member 44 are disposed on the side opposite to the shaft member 18 and the sensor 24 (see FIG. 2). In addition, the first permanent magnet member 40, the second permanent magnet member 42, and the third permanent magnet member 44 are arranged in the optical axis direction.

In the examples shown in FIGS. 2 and 3, the first permanent magnet member 40, the second permanent magnet member 42, and the third permanent magnet member 44 are all formed in a plate-like shape, but at least any of the first permanent magnet member 40, the second permanent magnet member 42, or the third permanent magnet member 44 may be formed in a shape other than the plate-like shape such as a block shape, for example.

In addition, in the examples shown in FIGS. 2 and 3, the first permanent magnet member 40, the second permanent magnet member 42, and the third permanent magnet member 44 have the same size, but may have different sizes. Alternatively, one of the first permanent magnet member 40, the second permanent magnet member 42, or the third permanent magnet member 44 may have a different size from the other two.

Further, in the examples shown in FIGS. 2 and 3, centers of the first permanent magnet member 40, the second permanent magnet member 42, and the third permanent magnet member 44 are located at the same radial position of the lens barrel 16, but the centers thereof may be located at different radial positions of the lens barrel 16. Alternatively, the center of one of the first permanent magnet member 40, the second permanent magnet member 42, or the third permanent magnet member 44 may be located at a different position from the centers of the other two.

The first permanent magnet member 40, the second permanent magnet member 42, and the third permanent magnet member 44 are all permanent magnets. Examples of the permanent magnet include a metal magnet, a ferrite magnet, and a bonded magnet. The first permanent magnet member 40, the second permanent magnet member 42, and the third permanent magnet member 44 may be formed of the same type of magnet or may be formed of different types of magnets. In addition, the type of magnet of one of the first permanent magnet member 40, the second permanent magnet member 42, or the third permanent magnet member 44 may be different from the types of magnets of the other two.

The first permanent magnet member 40, the second permanent magnet member 42, and the third permanent magnet member 44 are disposed by using the optical axis direction as a plate thickness direction. That is, the first permanent magnet member 40 and the second permanent magnet member 42 are disposed in orientations facing each other in the optical axis direction, and the first permanent magnet member 40 and the third permanent magnet member 44 are disposed in orientations facing each other in the optical axis direction.

The first permanent magnet member 40 has a first pole 40A and a second pole 40B. The first pole 40A is one of the N pole or the S pole, and the second pole 40B is the other of the N pole or the S pole. The first permanent magnet member 40 is disposed in an orientation in which the first pole 40A faces a second permanent magnet member 42 side and the second pole 40B faces a third permanent magnet member 44 side.

The second permanent magnet member 42 has a first pole 42A and a second pole 42B, and the third permanent magnet member 44 has a first pole 44A and a second pole 44B. The first pole 42A of the second permanent magnet member 42 and the first pole 44A of the third permanent magnet member 44 are the same poles as the first pole 40A of the first permanent magnet member 40, and the second pole 42B of the second permanent magnet member 42 and the second pole 44B of the third permanent magnet member 44 are the same poles as the second pole 40B of the first permanent magnet member 40.

The second permanent magnet member 42 and the third permanent magnet member 44 are disposed in orientations in which repulsive forces are generated with respect to the first permanent magnet member 40. That is, the second permanent magnet member 42 is disposed in an orientation in which the first pole 42A faces a first permanent magnet member 40 side and the second pole 42B faces a side opposite to the first permanent magnet member 40. In addition, the third permanent magnet member 44 is disposed in an orientation in which the first pole 44A faces a side opposite to the first permanent magnet member 40 and the second pole 44B faces the first permanent magnet member 40 side.

In this way, by disposing the first permanent magnet member 40, the second permanent magnet member 42, and the third permanent magnet member 44, as the lens frame 22 approaches the first movable end part 54, the first pole 40A of the first permanent magnet member 40 receives a repulsive force (hereinafter, referred to as a "first repulsive force") from the first pole 42A of the second permanent magnet member 42. Consequently, the movement speed of the lens frame 22 is reduced, thereby suppressing or avoiding the collision of the lens frame 22. Similarly, as the lens frame 22 approaches the second movable end part 56, the second pole 40B of the first permanent magnet member 40 receives a repulsive force (hereinafter, referred to as "second repulsive force") from the second pole 44B of the third permanent magnet member 44. Consequently, the movement speed of the lens frame 22 is reduced, thereby suppressing or avoiding the collision of the lens frame 22.

The first movable end part 54 is defined by a position where the movement of the lens frame 22 due to its own weight is restricted by the first permanent magnet member 40 receiving the first repulsive force from the second permanent magnet member 42 in a case where the imaging apparatus 10 is directed vertically downward in the non-energized state of the VCM. Similarly, the second movable end part 56 is defined by a position where the movement of the lens frame 22 due to its own weight is restricted by the first permanent magnet member 40 receiving the second repulsive force from the third permanent magnet member 44 in a case where the imaging apparatus 10 is directed vertically upward in the non-energized state of the VCM.

That is, in a case where the VCM is in a non-energized state, the lens frame 22 moves in the optical axis direction between the first movable end part 54 and the second movable end part 56. The first movable end part 54 is a first end part of a movable range of the lens frame 22 in a case where the VCM is in a non-energized state, and the second movable end part 56 is a second end part of the movable range of the lens frame 22 in a case where the VCM is in a non-energized state.

The first repulsive force received by the first permanent magnet member 40 from the second permanent magnet member 42 is set to a repulsive force that allows the lens frame 22 to avoid the collision with the lens barrel 16 by restricting the movement of the lens frame 22 at the first movable end part 54, for example, in a case where the imaging apparatus 10 is directed vertically downward in the non-energized state of the VCM. Similarly, the second repulsive force received by the first permanent magnet member 40 from the third permanent magnet member 44 is set to a repulsive force that allows the lens frame 22 to avoid the collision with the lens barrel 16 by restricting the movement of the lens frame 22 at the second movable end part 56, for example, in a case where the imaging apparatus 10 is directed vertically upward in the non-energized state of the VCM.

In addition, the first repulsive force received by the first permanent magnet member 40 from the second permanent magnet member 42 is set to a repulsive force that ensures the movement of the lens frame 22 in a case where the lens frame 22 moves to the first movable end part 54 in response to the energization of the VCM. In this case, a control of maintaining a state in which a driving force applied to the lens frame 22 from the VCM exceeds the first repulsive force is executed on the VCM, whereby the lens frame 22 may be moved to the first movable end part 54.

Similarly, the second repulsive force received by the first permanent magnet member 40 from the third permanent magnet member 44 is set to a repulsive force that ensures the movement of the lens frame 22 in a case where the lens frame 22 moves to the second movable end part 56 in response to the energization of the VCM. In this case, a control of maintaining a state in which the driving force applied to the lens frame 22 from the VCM exceeds the second repulsive force is executed on the VCM, whereby the lens frame 22 may be moved to the second movable end part 56.

Figure 4:
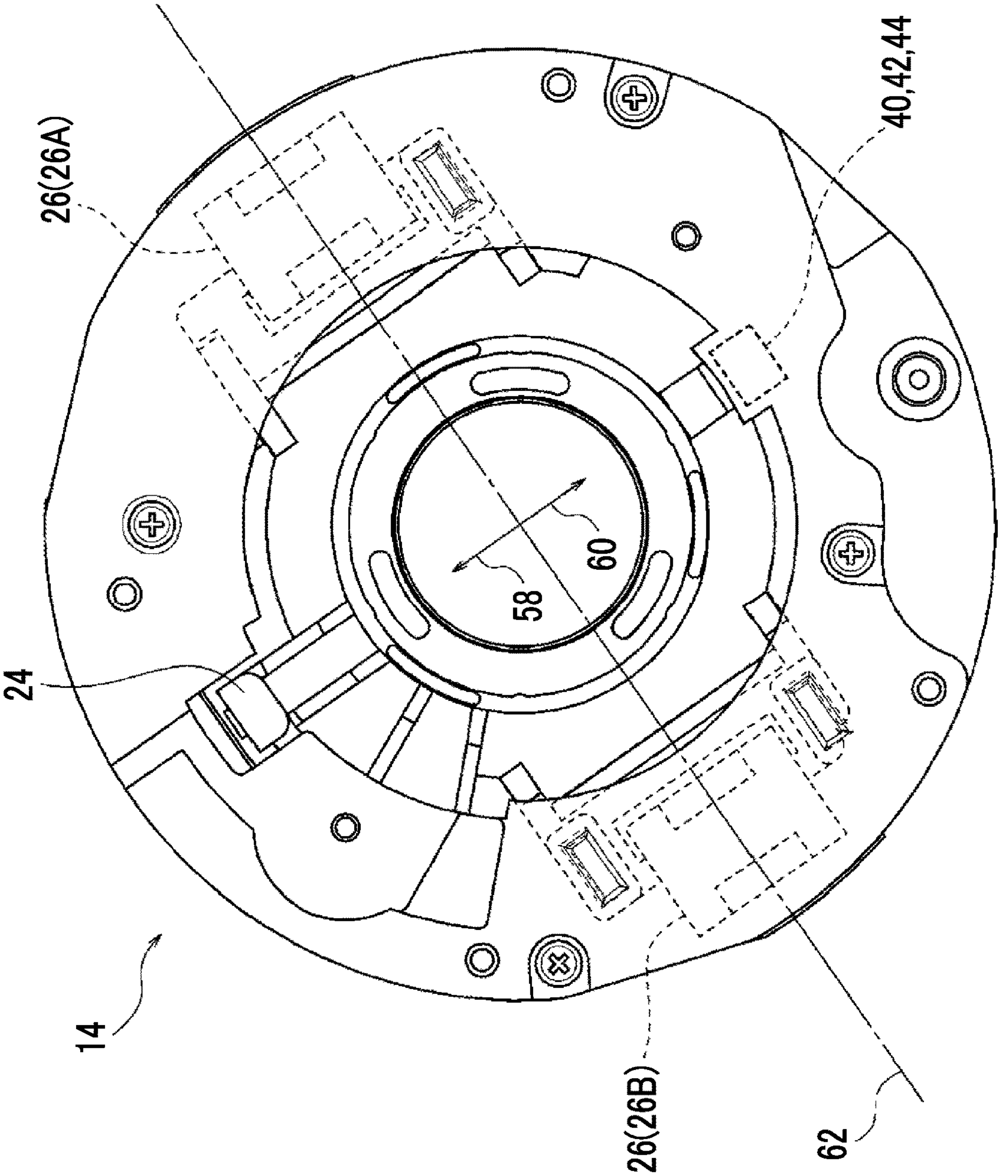
FIG. 4 is a plan view of the lens device as viewed from an image formation side.

FIG. 4 is a plan view of the lens device 14 as viewed from the image formation side. In FIGS. 2 and 3, one drive mechanism 26 is shown, but as shown in FIG. 4, the lens device 14 comprises, as an example, two drive mechanisms 26. Hereinafter, in a case where it is necessary to distinguish between the two drive mechanisms 26, one of the two drive mechanisms 26 will be referred to as a "first drive mechanism 26A", and the other of the two drive mechanisms 26 will be referred to as a "second drive mechanism 26B". The first drive mechanism 26A and the second drive mechanism 26B are examples of a "drive mechanism" according to the technology of the present disclosure.

The first drive mechanism 26A and the second drive mechanism 26B have the same configuration as an example. The second drive mechanism 26B is disposed on a radially opposite side of the lens barrel 16 from the first drive mechanism 26A as viewed from the optical axis direction. The lens device 14 includes a first region 58 and a second region 60 into which the lens device 14 is divided in the radial direction of the lens barrel 16 as viewed from the optical axis direction. The first region 58 and the second region 60 are regions divided by a line 62 connecting the first drive mechanism 26A and the second drive mechanism 26B as viewed from the optical axis direction. For example, the line 62 is a line that connects the center of the first drive mechanism 26A and the center of the second drive mechanism 26B as viewed from the optical axis direction.

In a case where the lens device 14 is divided into the first region 58 and the second region 60 in the radial direction of the lens barrel 16 as viewed from the optical axis direction, the sensor 24 is disposed in the first region 58, and the first permanent magnet member 40, the second permanent magnet member 42, and the third permanent magnet member 44 are disposed in the second region 60.

Next, the effects of the present embodiment will be described.

As described above in detail, the lens device 14 according to the present embodiment comprises the first permanent magnet member 40 provided on the lens frame 22, the second permanent magnet member 42 provided at the first end part 50 of the lens barrel 16 in the optical axis direction, and the third permanent magnet member 44 provided at the second end part 52 of the lens barrel 16 in the optical axis direction. Therefore, the first pole 40A of the first permanent magnet member 40 receives the first repulsive force from the first pole 42A of the second permanent magnet member 42 as the lens frame 22 approaches the first movable end part 54, for example, even in a case where the imaging apparatus 10 is tilted forward in a state in which the lens frame 22 is allowed to move in the non-energized state of the VCM. Consequently, the movement speed of the lens frame 22 is reduced, so that it is possible to suppress or avoid the collision of the lens frame 22 with the lens barrel 16 upon moving in the optical axis direction.

Similarly, the second pole 40B of the first permanent magnet member 40 receives the second repulsive force from the second pole 44B of the third permanent magnet member 44 as the lens frame 22 approaches the second movable end part 56, for example, even in a case where the imaging apparatus 10 is tilted rearward in a state in which the lens frame 22 is allowed to move in the non-energized state of the VCM. Consequently, the movement speed of the lens frame 22 is reduced, so that it is possible to suppress or avoid the collision of the lens frame 22 with the lens barrel 16 upon moving in the optical axis direction. As a result, it is possible to suppress or avoid the occurrence of the impact and/or the collision sound, so that it is possible to suppress the discomfort experienced by the user who uses the imaging apparatus 10 as compared with a case where the impact and/or the collision sound occurs.

In addition, the first permanent magnet member 40, the second permanent magnet member 42, and the third permanent magnet member 44 are all permanent magnets. Therefore, for example, the structure of the lens device 14 can be simplified as compared with a case where at least any of the first permanent magnet member 40, the second permanent magnet member 42, or the third permanent magnet member 44 is an electromagnet. As a result, it is possible to reduce the weight and/or the cost of the lens device 14.

Further, the first permanent magnet member 40 has the first pole 40A that receives the repulsive force from the second permanent magnet member 42 and the second pole 40B that receives the repulsive force from the third permanent magnet member 44. That is, the first permanent magnet member 40 is used as a common permanent magnet member for the second permanent magnet member 42 and the third permanent magnet member 44. Therefore, the structure of the lens device 14 can be simplified as compared with, for example, a case where the lens frame 22 includes a permanent magnet member that receives the first repulsive force from the second permanent magnet member 42 and a permanent magnet member that receives the second repulsive force from the third permanent magnet member 44. As a result, it is possible to reduce the weight and/or the cost of the lens device 14.

Moreover, in a case where the lens device 14 is divided into the first region 58 and the second region 60 in the radial direction of the lens barrel 16 as viewed from the optical axis direction, the sensor 24 is disposed in the first region 58, and the first permanent magnet member 40, the second permanent magnet member 42, and the third permanent magnet member 44 are disposed in the second region 60. Therefore, the sensor 24 can be positioned away from the first permanent magnet member 40, the second permanent magnet member 42, and the third permanent magnet member 44, as compared with, for example, a case where the first permanent magnet member 40, the second permanent magnet member 42, and the third permanent magnet member 44 are disposed in the first region 58 in addition to the sensor 24.

As a result, it is possible to suppress the influence of the magnetic field of the first permanent magnet member 40, the second permanent magnet member 42, and the third permanent magnet member 44 on the sensor 24, so that it is possible to accurately detect the position of the lens frame 22 by using the sensor 24.

Next, modification examples of the present embodiment will be described.

Figure 5:
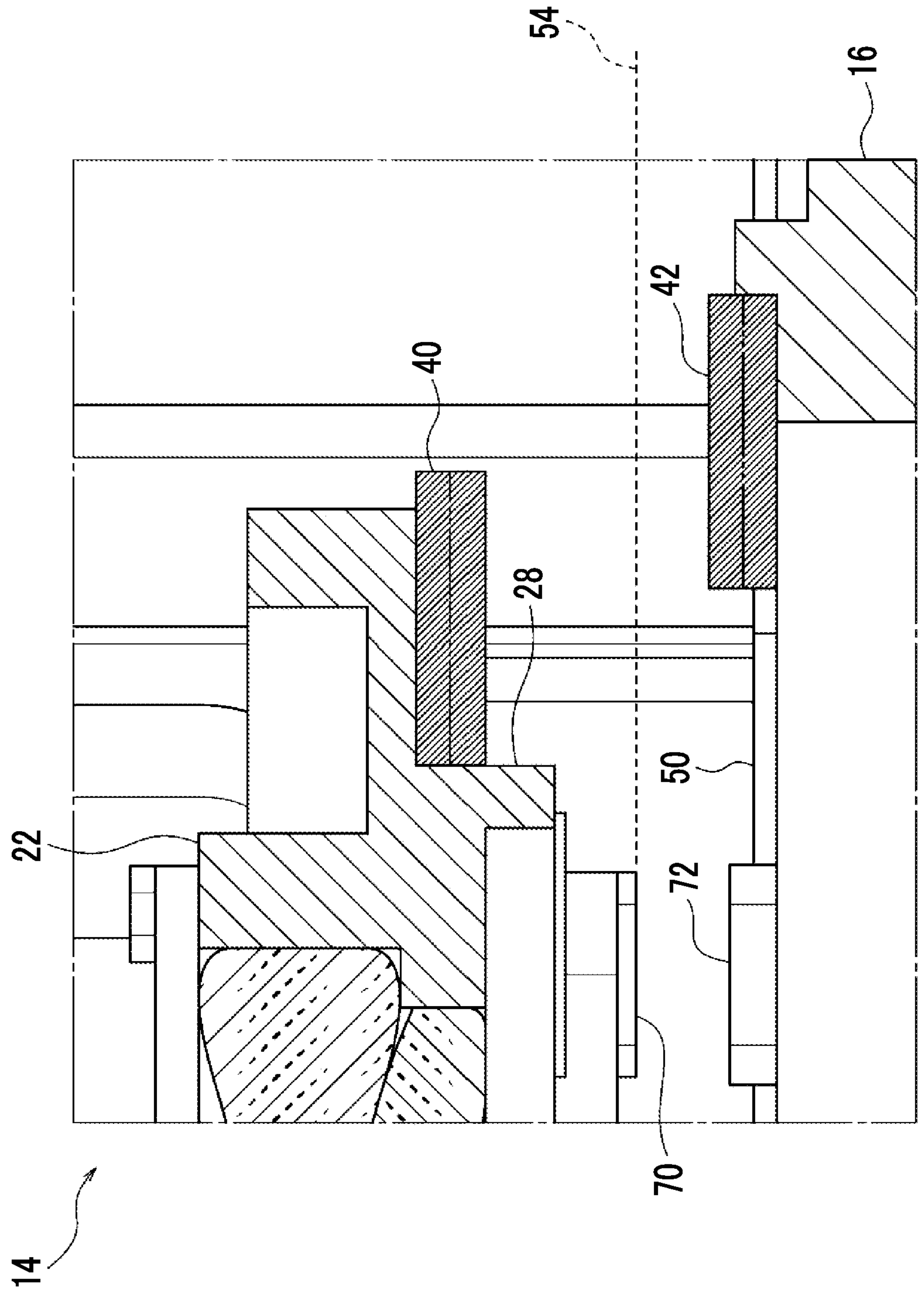
FIG. 5 is a longitudinal sectional view showing a main part of a lens device according to a first modification example in an enlarged manner.

FIG. 5 is a longitudinal sectional view showing a main part of the lens device 14 according to a first modification example in an enlarged manner. As shown in FIG. 5, in the lens device 14 according to the first modification example, a first contact portion 70 is provided on the holding portion 28 of the lens frame 22, and a second contact portion 72 is provided at the first end part 50 of the lens barrel 16. The first contact portion 70 is provided at a part of the lens frame 22 that is different from a part where the first permanent magnet member 40 is provided, and the second contact portion 72 is provided at a part of the first end part 50 that is different from a part where the second permanent magnet member 42 is provided.

The first contact portion 70 protrudes toward the first end part 50 of the lens barrel 16, and the second contact portion 72 protrudes toward the lens frame 22. The first contact portion 70 and the second contact portion 72 are disposed at positions where the first contact portion 70 and the second contact portion 72 come into contact with each other. The second contact portion 72 is disposed at a position where the second contact portion 72 comes into contact with the first contact portion 70 before the first permanent magnet member 40 and the second permanent magnet member 42 come into contact with each other, for example, in a case where the lens frame 22 is moved in the direction of the first end part 50 against the first repulsive force in response to an acceleration applied to the lens frame 22. Specifically, the second contact portion 72 is disposed between the first movable end part 54 and the first end part 50.

With this configuration, it is possible to avoid direct contact between the first permanent magnet member 40 and the second permanent magnet member 42 in a case where the lens frame 22 is moved in the direction of the first end part 50 against the first repulsive force. As a result, it is possible to avoid the damage to the first permanent magnet member 40 and the second permanent magnet member 42.

Figure 6:
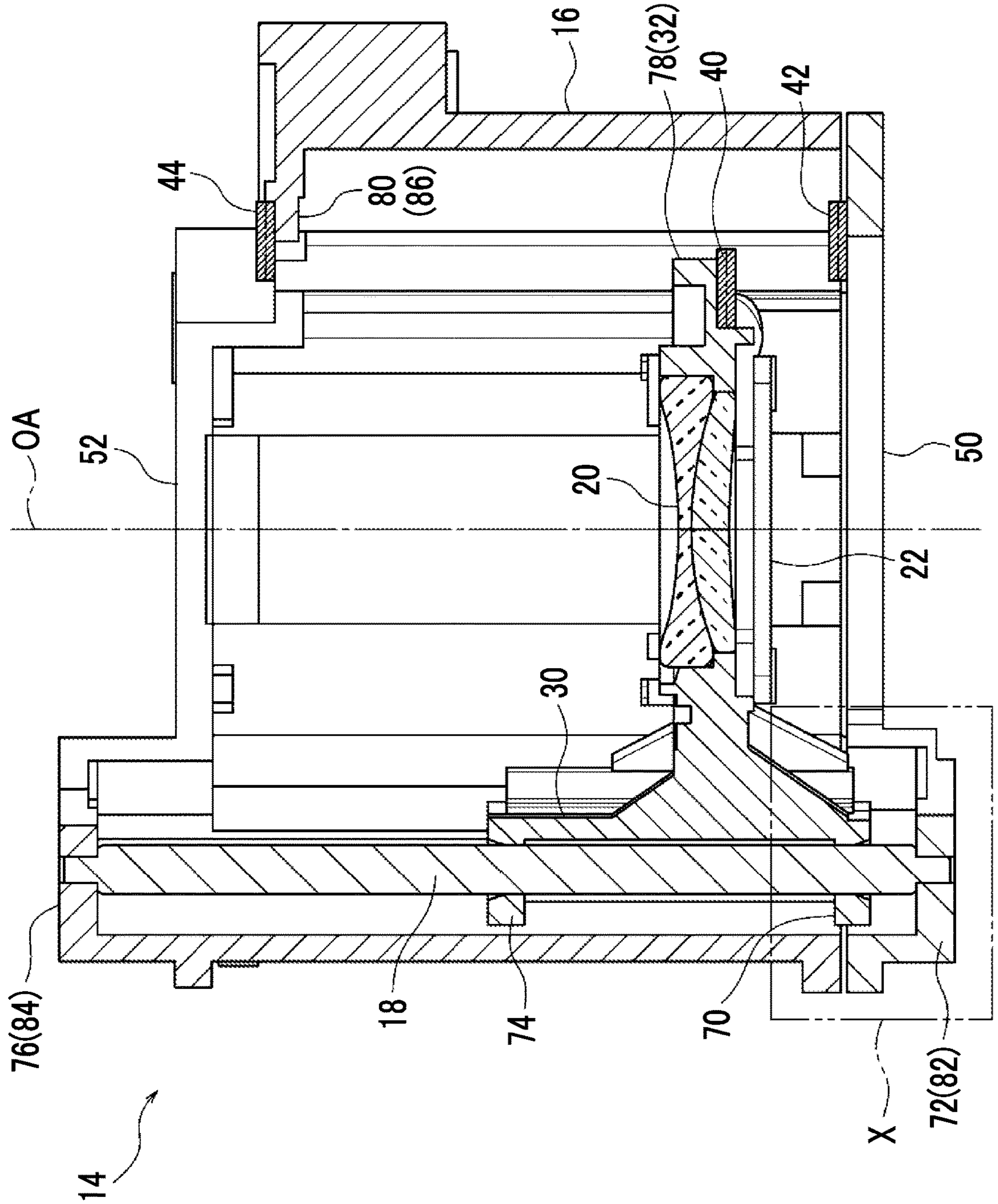
FIG. 6 is a longitudinal sectional view of a lens device according to a second modification example.
Figure 7:
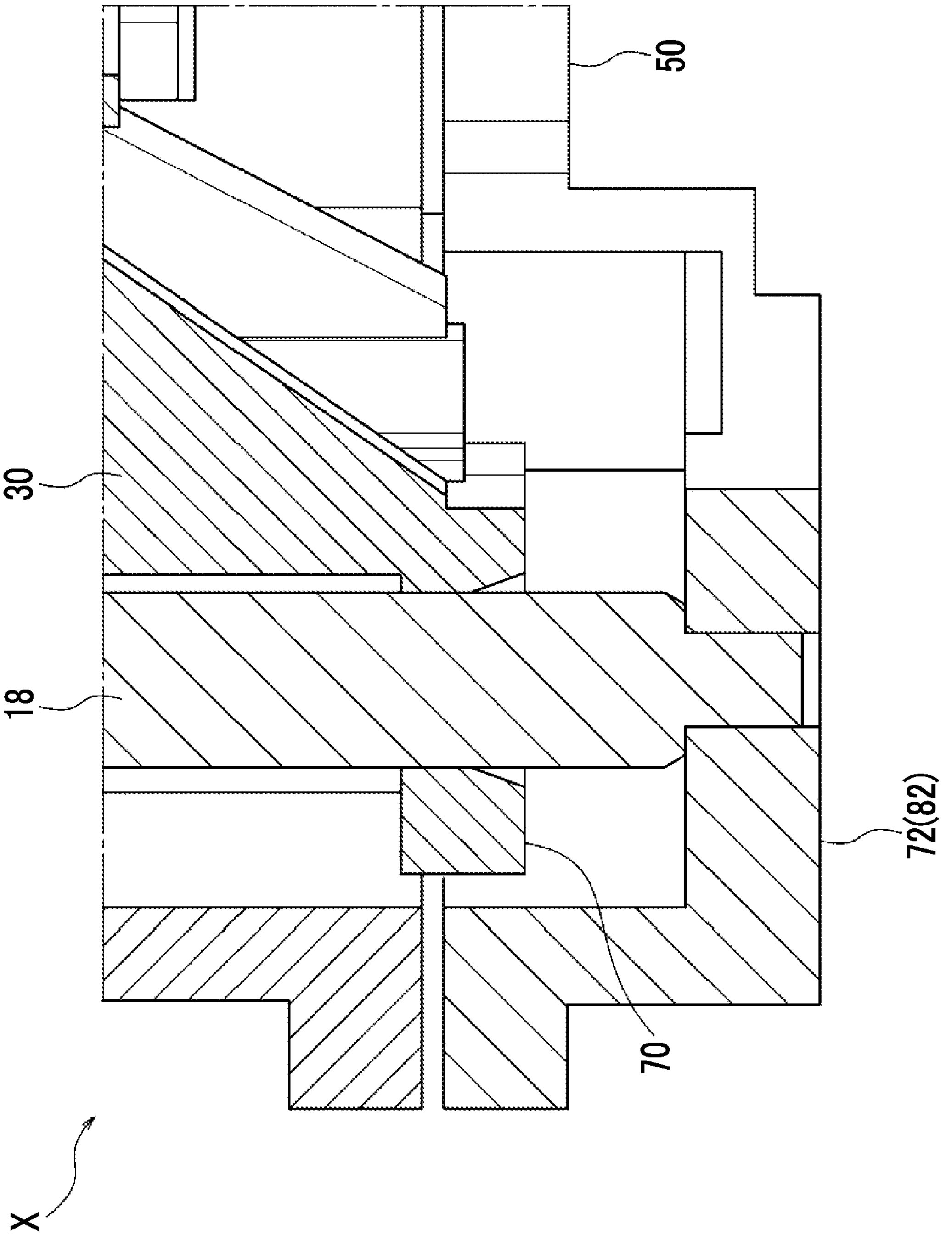
FIG. 7 is an enlarged view of an X part of FIG. 6.

FIG. 6 is a longitudinal sectional view of the lens device 14 according to a second modification example, and FIG. 7 is an enlarged view of an X part of FIG. 6. As shown in FIGS. 6 and 7, in the lens device 14 according to the second modification example, the first contact portion 70 is provided on the lens frame 22, and the second contact portion 72 is provided at the first end part 50 of the lens barrel 16 (that is, the wall part of the lens barrel 16 on the object side). The first contact portion 70 is provided at a part of the lens frame 22 that is different from the part where the first permanent magnet member 40 is provided. Specifically, the first contact portion 70 is provided at an end part of the movement portion 30 on the object side within the lens frame 22.

The second contact portion 72 is provided at a part of the first end part 50 that is different from a part where the second permanent magnet member 42 is provided. Specifically, a first support portion 82 that supports an end part of the shaft member 18 on the object side is provided at the first end part 50, and the first support portion 82 also serves as the second contact portion 72. The second contact portion 72 is disposed at a position where the second contact portion 72 comes into contact with the first contact portion 70 before the first permanent magnet member 40 and the second permanent magnet member 42 come into contact with each other, for example, in a case where the lens frame 22 is moved in the direction of the first end part 50 against the first repulsive force in response to an acceleration applied to the lens frame 22.

With this configuration, it is also possible to avoid direct contact between the first permanent magnet member 40 and the second permanent magnet member 42 in a case where the lens frame 22 is moved in the direction of the first end part 50 against the first repulsive force. As a result, it is possible to avoid the damage to the first permanent magnet member 40 and the second permanent magnet member 42.

In addition, as shown in FIG. 6, in the lens device 14 according to the second modification example, a third contact portion 74 is provided on the lens frame 22, and a fourth contact portion 76 is provided at the second end part 52 of the lens barrel 16 (that is, the wall part of the lens barrel 16 on the image formation side). The third contact portion 74 is provided at a part of the lens frame 22 that is different from the part where the first permanent magnet member 40 is provided. Specifically, the third contact portion 74 is provided at an end part of the movement portion 30 on the image formation side within the lens frame 22.

The fourth contact portion 76 is provided at a part of the second end part 52 that is different from a part where the third permanent magnet member 44 is provided. Specifically, a second support portion 84 that supports an end part of the shaft member 18 on the image formation side is provided at the second end part 52, and the second support portion 84 also serves as the fourth contact portion 76. The fourth contact portion 76 is disposed at a position where the fourth contact portion 76 comes into contact with the third contact portion 74 before the first permanent magnet member 40 and the third permanent magnet member 44 come into contact with each other, for example, in a case where the lens frame 22 is moved in the direction of the second end part 52 against the second repulsive force in response to an acceleration applied to the lens frame 22.

With this configuration, it is possible to avoid direct contact between the first permanent magnet member 40 and the third permanent magnet member 44 in a case where the lens frame 22 is moved in the direction of the second end part 52 against the second repulsive force. As a result, it is possible to avoid the damage to the first permanent magnet member 40 and the third permanent magnet member 44.

As shown in FIG. 6, the extending portion 32 of the lens frame 22 may be configured to also serve as a fifth contact portion 78. In addition, a stepped portion 86 may be provided at the second end part 52 of the lens barrel 16, the third permanent magnet member 44 may be provided on a surface of the stepped portion 86 on the image formation side, and a surface of the stepped portion 86 on the object side may be formed as a sixth contact portion 80. In a case where the lens frame 22 moves in the direction of the second end part 52 against the second repulsive force, the sixth contact portion 80 may come into contact with the fifth contact portion 78 before the first permanent magnet member 40 and the third permanent magnet member 44 come into contact with each other.

With this configuration, it is also possible to avoid direct contact between the first permanent magnet member 40 and the third permanent magnet member 44 in a case where the lens frame 22 is moved in the direction of the second end part 52 against the second repulsive force. As a result, it is possible to avoid the damage to the first permanent magnet member 40 and the third permanent magnet member 44. The fifth contact portion 78 is an example of a "third contact portion" according to the technology of the present disclosure, and the sixth contact portion 80 is an example of a "fourth contact portion" according to the technology of the present disclosure.

Figure 8:
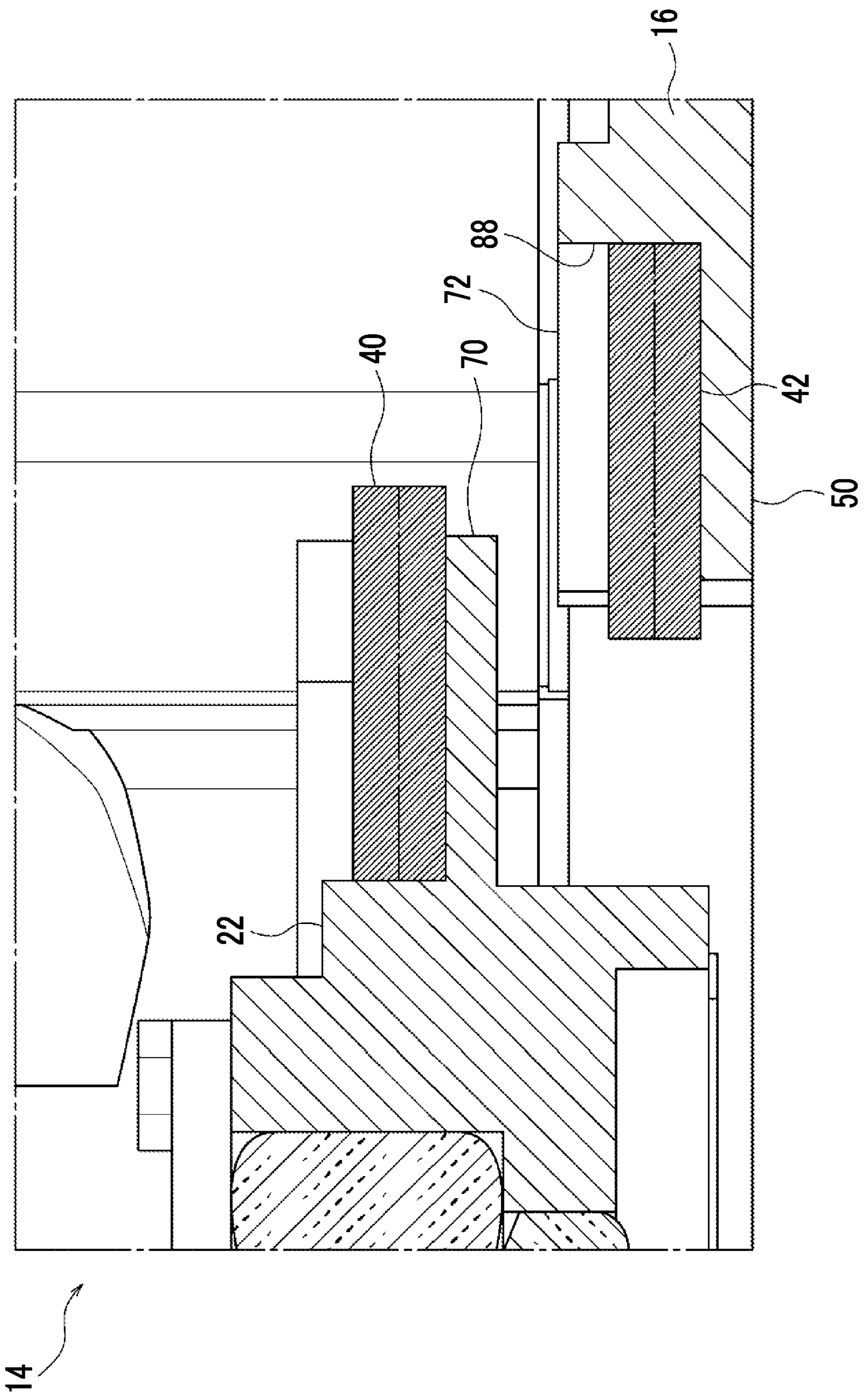
FIG. 8 is a longitudinal sectional view showing a main part of a lens device according to a third modification example in an enlarged manner.
Figure 9:
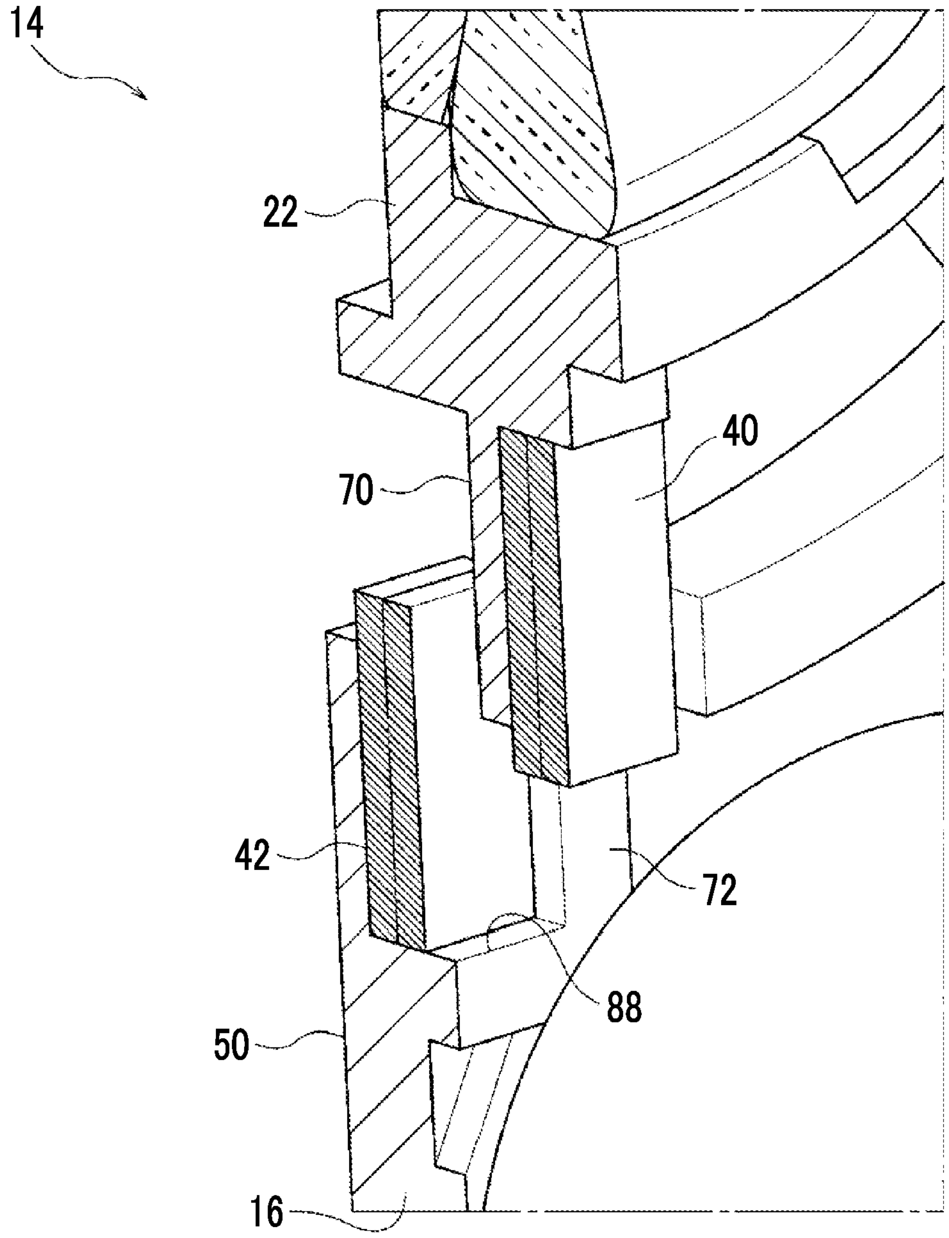
FIG. 9 is a perspective view of a portion shown in FIG. 8.

FIG. 8 is a longitudinal sectional view showing a main part of the lens device 14 according to a third modification example in an enlarged manner, and FIG. 9 is a perspective view of a portion shown in FIG. 8. As shown in FIGS. 8 and 9, in the lens device 14 according to the third modification example, the first contact portion 70 is provided on the lens frame 22, and the second contact portion 72 is provided at the first end part 50 of the lens barrel 16. The first contact portion 70 is provided at a position corresponding to the part of the lens frame 22 where the first permanent magnet member 40 is provided. Specifically, the first contact portion 70 is disposed on the object side of the first permanent magnet member 40, and the first permanent magnet member 40 is overlaid on the first contact portion 70.

The second contact portion 72 is provided at a position corresponding to a part of the first end part 50 where the second permanent magnet member 42 is provided. Specifically, a housing groove 88 that is open to the image formation side is formed at the first end part 50, and the second permanent magnet member 42 is housed in the housing groove 88. A depth dimension of the housing groove 88 is larger than a thickness dimension of the second permanent magnet member 42. The second contact portion 72 is formed by a peripheral edge part of the opening of the housing groove 88. The second contact portion 72 is disposed at a position where the second contact portion 72 comes into contact with the first contact portion 70 before the first permanent magnet member 40 and the second permanent magnet member 42 come into contact with each other, for example, in a case where the lens frame 22 is moved in the direction of the first end part 50 against the first repulsive force in response to an acceleration applied to the lens frame 22.

With this configuration, it is also possible to avoid direct contact between the first permanent magnet member 40 and the second permanent magnet member 42 in a case where the lens frame 22 is moved in the direction of the first end part 50 against the first repulsive force. As a result, it is possible to avoid the damage to the first permanent magnet member 40 and the second permanent magnet member 42.

In addition, although FIG. 8 shows an example in which the first contact portion 70 is provided on the object side of the first permanent magnet member 40 and the second contact portion 72 is provided on the image formation side of the second permanent magnet member 42, the third contact portion similar to the first contact portion 70 may be provided on the image formation side of the first permanent magnet member 40, and the fourth contact portion similar to the second contact portion 72 may be provided on the object side of the third permanent magnet member 44.

Figure 10:
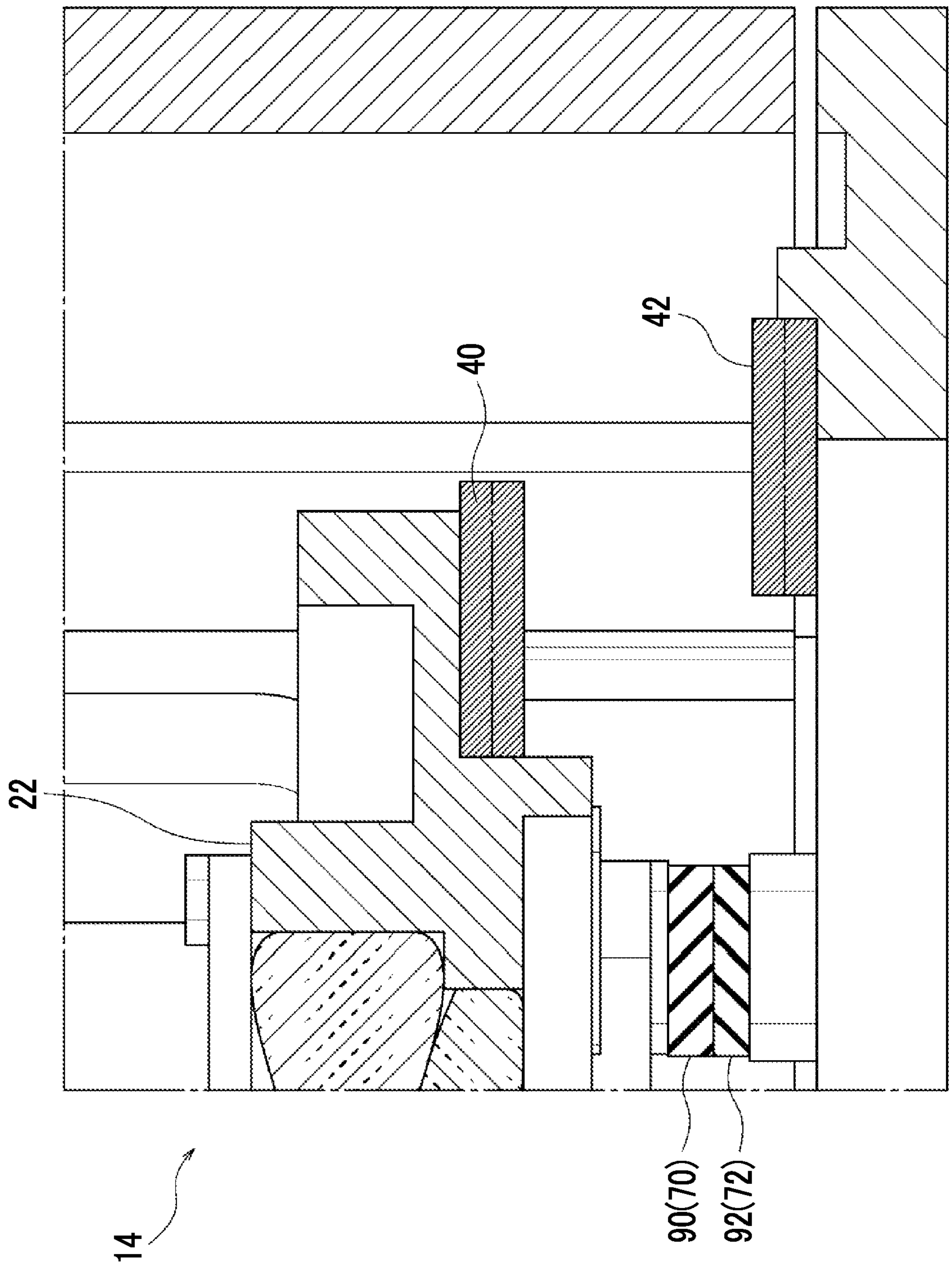
FIG. 10 is a longitudinal sectional view showing a main part of a lens device according to a fourth modification example in an enlarged manner.

FIG. 10 is a longitudinal sectional view showing a main part of the lens device 14 according to a fourth modification example in an enlarged manner. In the fourth modification example shown in FIG. 10, a configuration is changed as follows with respect to the above-mentioned first modification example (see FIG. 5). That is, the lens device 14 according to the fourth modification example comprises a first buffering member 90 and a second buffering member 92. The first buffering member 90 and the second buffering member 92 are examples of a "buffering member" according to the technology of the present disclosure.

The first buffering member 90 and the second buffering member 92 are rubber materials as an example, but may be buffering members other than the rubber materials such as a sponge material, for example. The first buffering member 90 is provided on the first contact portion 70, and the second buffering member 92 is provided on the second contact portion 72. Specifically, the first buffering member 90 forms a part of the first contact portion 70 on the object side, and the second buffering member 92 forms a part of the second contact portion 72 on the image formation side.

With this configuration, for example, it is possible to alleviate the impact in a case where the first contact portion 70 and the second contact portion 72 come into contact with each other as compared with a case where the first contact portion 70 and the second contact portion 72 are formed of plastic or metal.

In the fourth modification example, one of the first buffering member 90 or the second buffering member 92 may be omitted. With this configuration, it is also possible to alleviate the impact in a case where the first contact portion 70 and the second contact portion 72 come into contact with each other as compared with, for example, a case where the first contact portion 70 and the second contact portion 72 are formed of plastic or metal.

Figure 11:
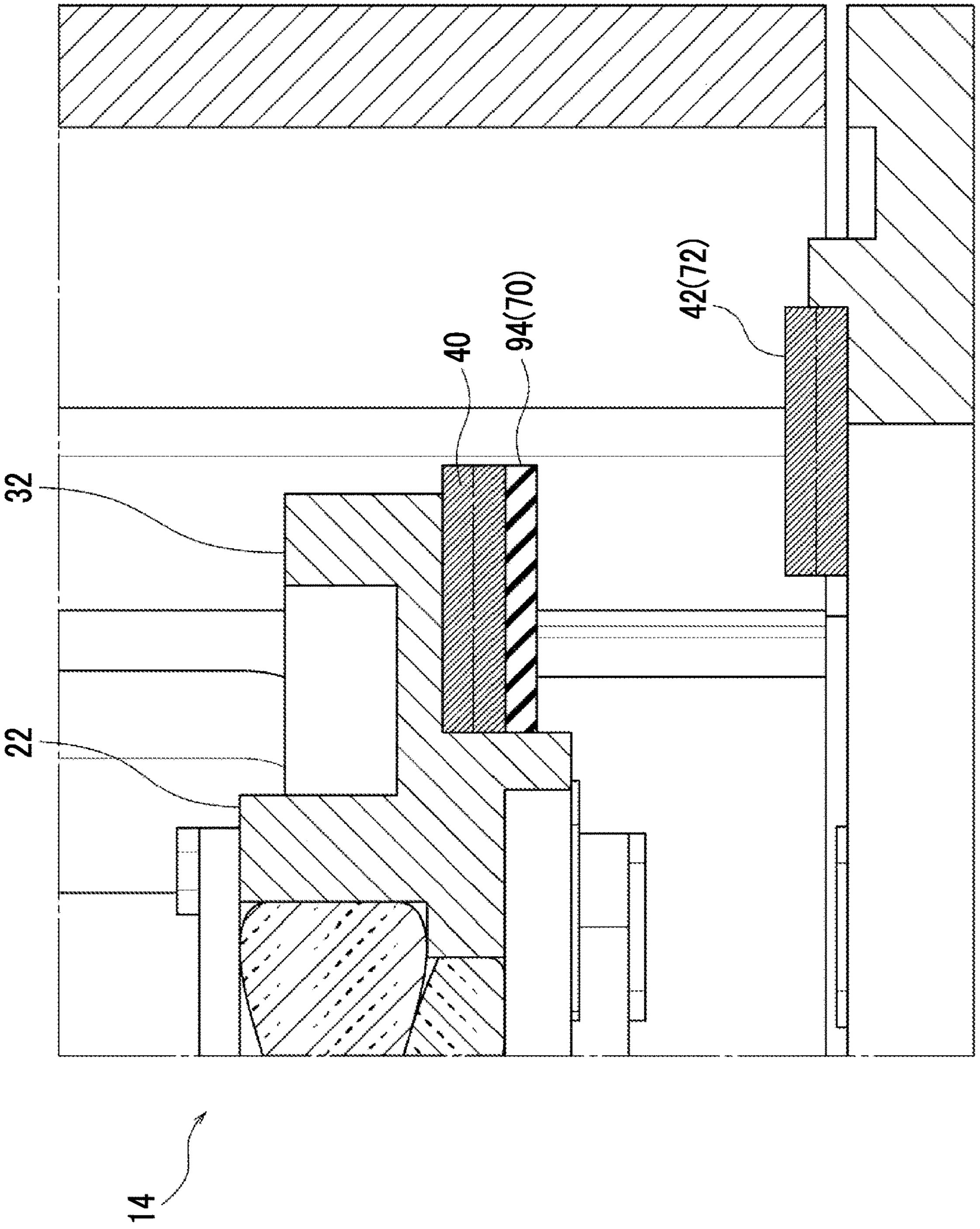
FIG. 11 is a longitudinal sectional view showing a main part of a lens device according to a fifth modification example in an enlarged manner.

FIG. 11 is a longitudinal sectional view showing a main part of the lens device 14 according to a fifth modification example in an enlarged manner. As shown in FIG. 11, the lens device 14 according to the fifth modification example comprises a buffering member 94. The buffering member 94 is a rubber material as an example, but may be, for example, a buffering member 94 such as a sponge material other than the rubber material. The buffering member 94 is provided on a surface of the first permanent magnet member 40 on the object side surface. The buffering member 94 may be adhered to the surface of the first permanent magnet member 40 on the object side with a double-sided tape or may be bonded with an adhesive.

The buffering member 94 also serves as the first contact portion 70, and the second permanent magnet member 42 also serves as the second contact portion 72. The buffering member 94 is disposed at a position where the buffering member 94 comes into contact with the second permanent magnet member 42 before the first permanent magnet member 40 and the second permanent magnet member 42 come into contact with each other, for example, in a case where the lens frame 22 is moved in the direction of the first end part 50 against the first repulsive force in response to an acceleration applied to the lens frame 22.

With this configuration, it is also possible to avoid direct contact between the first permanent magnet member 40 and the second permanent magnet member 42 in a case where the lens frame 22 is moved in the direction of the first end part 50 against the first repulsive force. As a result, it is possible to avoid the damage to the first permanent magnet member 40 and the second permanent magnet member 42.

In the fifth modification example, the buffering member 94 may be provided on the surface of the second permanent magnet member 42 on the image formation side. The buffering member 94 may also serve as the second contact portion 72, and the first permanent magnet member 40 may also serve as the first contact portion 70. In addition, in the fifth modification example, a first buffering member may be provided on the surface of the first permanent magnet member 40 on the object side, and a second buffering member may be provided on the surface of the second permanent magnet member 42 on the image formation side.

With this configuration, it is also possible to avoid direct contact between the first permanent magnet member 40 and the second permanent magnet member 42 in a case where the lens frame 22 is moved in the direction of the first end part 50 against the first repulsive force. As a result, it is possible to avoid the damage to the first permanent magnet member 40 and the second permanent magnet member 42.

In addition, the first permanent magnet member 40 and/or the second permanent magnet member 42 may be formed of the buffering member. Further, the first permanent magnet member 40 and/or the second permanent magnet member 42 may be formed of a bonded magnet as the buffering member. The bonded magnet may be a plastic magnet or a rubber magnet.

With this configuration, it is possible to avoid the damage to the first permanent magnet member 40 and the second permanent magnet member 42 even in a case where the first permanent magnet member 40 and the second permanent magnet member 42 come into direct contact with each other, as compared with a case where the first permanent magnet member 40 and the second permanent magnet member 42 are formed of the metal magnet or the ferrite magnet.

In addition, although FIG. 11 shows an example in which the first permanent magnet member 40 is provided on the object side of the extending portion 32, the first permanent magnet member 40 may be provided on the image formation side of the extending portion 32. Further, in this case, the buffering member 94 may be provided on the surface of the first permanent magnet member 40 on the image formation side, or the buffering member 94 may be provided on the surface of the third permanent magnet member 44 on the object side.

In addition, the third permanent magnet member 44 (see FIG. 3) may be formed of a buffering member. Further, the third permanent magnet member 44 may be formed of a bonded magnet as the buffering member. The bonded magnet may be a plastic magnet or a rubber magnet.

Figure 12:
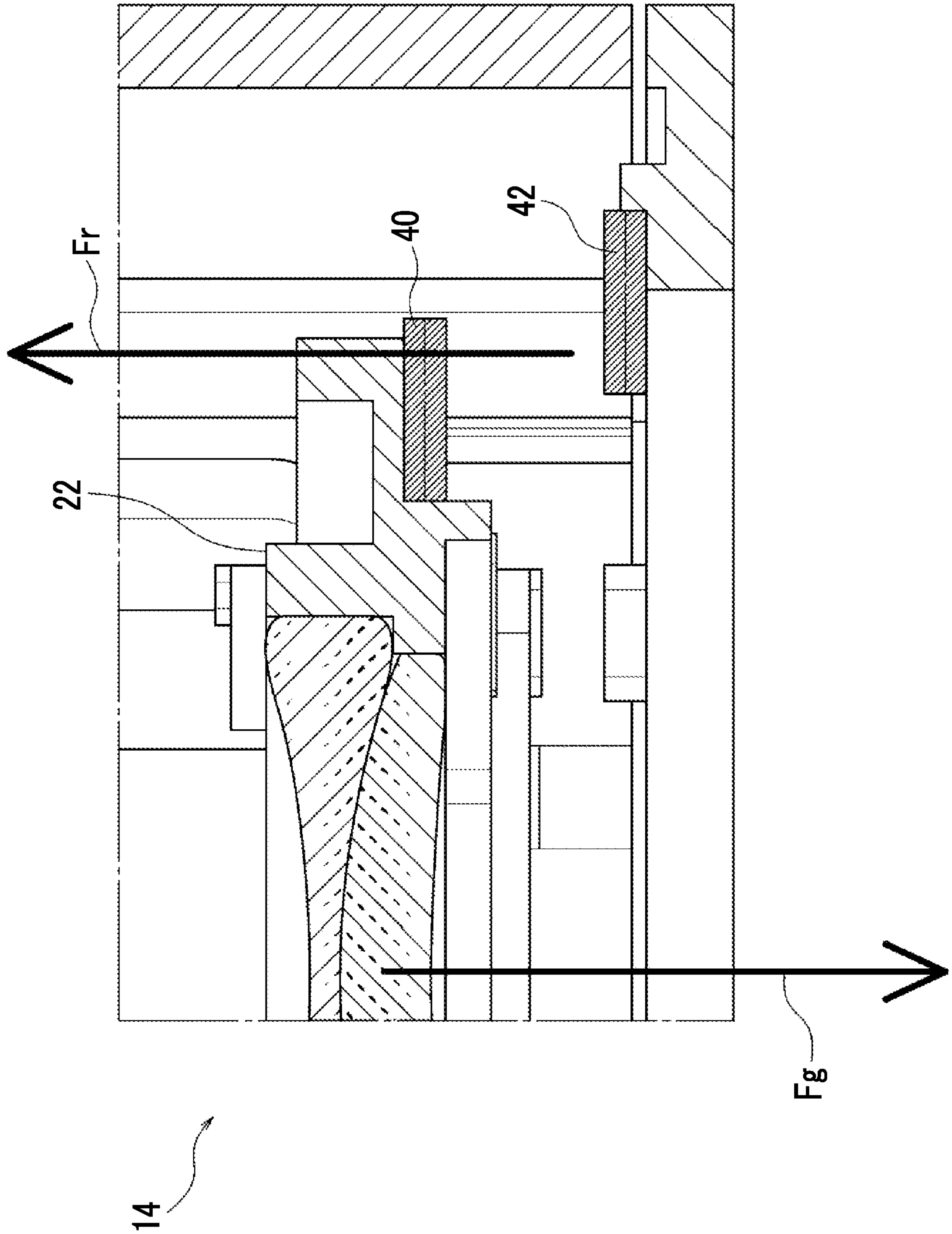
FIG. 12 is a longitudinal sectional view showing a relationship between a repulsive force and a gravitational force acting on a lens frame according to a sixth modification example.
Figure 13:
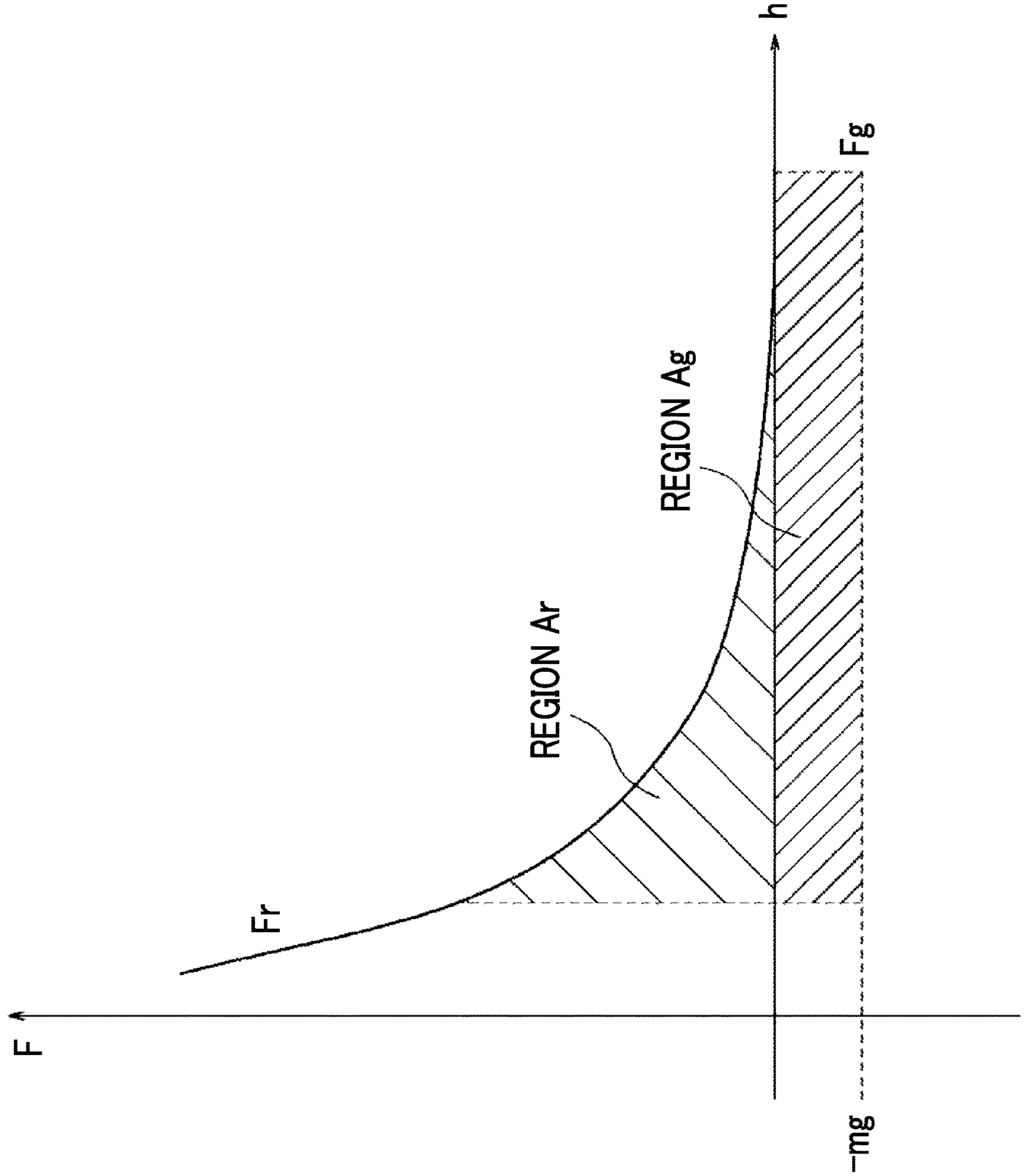
FIG. 13 is a diagram showing a relationship between a height of the lens frame according to the sixth modification example and a force acting on the lens frame.

FIG. 12 is a longitudinal sectional view showing a relationship between a repulsive force Fr and a gravitational force Fg acting on the lens frame 22 according to a sixth modification example. FIG. 13 is a diagram showing a relationship between a height h of the lens frame 22 according to the sixth modification example and a force F acting on the lens frame 22. FIGS. 12 and 13 are diagrams showing an example in which the imaging apparatus 10 is directed vertically downward and the lens frame 22 is moved in the direction of the first end part 50 by its own weight. The repulsive force Fr corresponds to the first repulsive force received by the first permanent magnet member 40 from the second permanent magnet member 42. The height h indicates a height with reference to a position of the lens frame 22 in a case where the lens frame 22 collides with the lens barrel 16 on a first end part 50 side.

The repulsive force Fr received by the first permanent magnet member 40 from the second permanent magnet member 42 is proportional to the square of the distance between the first permanent magnet member 40 and the second permanent magnet member 42. Meanwhile, a constant gravitational force Fg acts on the lens frame 22 that falls because of its own weight. The gravitational force Fg is obtained by a product of a mass m of a moving object, which includes the lens 20 and the lens frame 22, and a gravitational acceleration g. A first work amount W1, which is a work amount by the repulsive force Fr, is shown in a region Ar in FIG. 13. A second work amount W2, which is a work amount by the gravitational force Fg, is shown in a region Ag in FIG. 13.

In a case where the lens frame 22 falls from a certain height, a difference between the first work amount W1 and the second work amount W2 (that is, a difference between the region Ar and the region Ag) is collision energy in a case where the lens frame 22 collides with the lens barrel 16. Ideally, the size and the disposition of the first permanent magnet member 40 and the second permanent magnet member 42 are determined such that the region Ar and the region Ag are equal to each other in a case where the height of the lens frame 22 is zero. However, an effect of reducing the impact and/or the collision sound can be obtained even in a case where the region Ar and the region Ag are not equal to each other. Specifically, it is desirable that the relationship between the first work amount W1 and the second work amount W2 satisfies Equation (1).

$$0.5 \leq W1/W2 \leq 1.5 \tag{1}$$

Here, in a case where W1/W2 falls below 0.5, the impact and/or the collision sound, which may make the user who uses the imaging apparatus 10 uncomfortable, occurs. In addition, in a case where W1/W2 exceeds 1.5, it is necessary to perform a control of increasing the driving force of the VCM as the repulsive force Fr increases in order to move the lens frame 22 to the first movable end part 54 against the repulsive force Fr. On the other hand, in a case where W1/W2 is 0.5 or more, it is possible to suppress the occurrence of the impact and/or the collision sound, which may make the user who uses the imaging apparatus 10 uncomfortable. In addition, in a case where W1/W2 is 1.5 or less, it is possible to eliminate the need for the control of increasing the driving force of the VCM as the repulsive force Fr increases even in a case where the lens frame 22 is moved to the first movable end part 54 against the repulsive force Fr.

Although FIGS. 12 and 13 show an example in which the imaging apparatus 10 is directed vertically downward and the lens frame 22 is moved in the direction of the first end part 50 by its own weight, the same concept as described above may also be applied to a case where the imaging apparatus 10 is directed vertically upward and the lens frame 22 is moved in the direction of the second end part 52 by its own weight.

That is, in a case where the work amount by the repulsive force Fr received by the first permanent magnet member 40 from the third permanent magnet member 44 is denoted by the first work amount W1, and the work amount by the gravitational force Fg acting on the lens frame 22 that falls because of its own weight is denoted by the second work amount W2, the relationship between the first work amount W1 and the second work amount W2 may satisfy Equation (1).

Here, in a case where W1/W2 falls below 0.5, the impact and/or the collision sound, which may make the user who uses the imaging apparatus 10 uncomfortable, occurs. In addition, in a case where W1/W2 exceeds 1.5, it is necessary to perform a control of increasing the driving force of the VCM as the repulsive force Fr increases in order to move the lens frame 22 to the second movable end part 56 against the repulsive force Fr. On the other hand, in a case where W1/W2 is 0.5 or more, it is possible to suppress the occurrence of the impact and/or the collision sound, which may make the user who uses the imaging apparatus 10 uncomfortable. In addition, in a case where W1/W2 is 1.5 or less, it is possible to eliminate the need for the control of increasing the driving force of the VCM as the repulsive force Fr increases even in a case where the lens frame 22 is moved to the second movable end part 56 against the repulsive force Fr.

Figure 14:
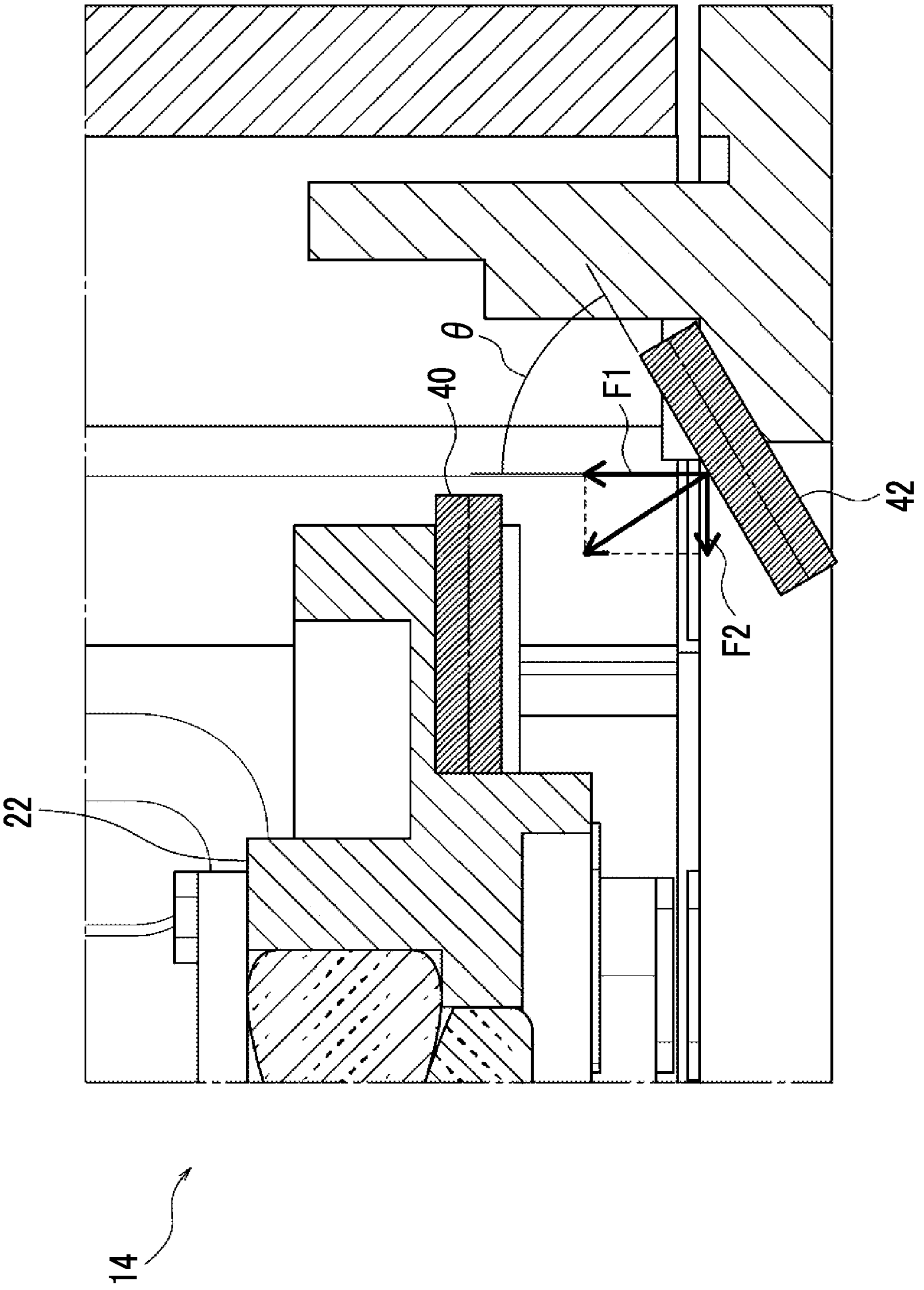
FIG. 14 is a longitudinal sectional view showing a main part of a lens device according to a seventh modification example in an enlarged manner.

FIG. 14 is a longitudinal sectional view showing a main part of the lens device 14 according to a seventh modification example in an enlarged manner. As shown in FIG. 14, in the lens device 14 according to the seventh modification example, the second permanent magnet member 42 is inclined with respect to the optical axis direction as viewed from a cross direction with respect to the optical axis direction (that is, as viewed as shown in FIG. 14). An inclination angle θ of the second permanent magnet member 42 with respect to the optical axis direction is set to an inclination angle at which the second permanent magnet member 42 generates a first repulsive force component F1 in the optical axis direction and a second repulsive force component F2 in the radial direction of the lens barrel 16 with respect to the first permanent magnet member 40.

With this configuration, the second repulsive force component F2 acts on the lens frame 22 while the first repulsive force component F1 applies a repulsive force in the optical axis direction to the lens frame 22, whereby a frictional force can be applied between the shaft member 18 and the movement portion 30 (see FIG. 2 for both). As a result, it is possible to increase a braking force with respect to the lens frame 22 as compared with a case where only the first repulsive force in the optical axis direction is applied to the lens frame 22.

The above-mentioned inclination angle θ may be 45 degrees or more and less than 90 degrees. In a case where the inclination angle θ is less than 45 degrees, the first repulsive force component F1 may be smaller than the second repulsive force component F2. In a case where the inclination angle θ is more than 90 degrees, the second repulsive force component F2 may not be obtained. On the other hand, in a case where the inclination angle θ is 45 degrees or more and less than 90 degrees, the first repulsive force component F1 can be made larger than the second repulsive force component F2, and the second repulsive force component F2 can also be obtained.

In addition, the second permanent magnet member 42 may be disposed at a different radial position of the lens barrel 16 with respect to the first permanent magnet member 40 as viewed from the cross direction with respect to the optical axis direction. That is, the center of the second permanent magnet member 42 may be shifted to the radially outward side of the lens barrel 16 with respect to the center of the first permanent magnet member 40.

With this configuration, it is possible to reduce the distance between the first permanent magnet member 40 and the second permanent magnet member 42 in the optical axis direction as compared with a case where the second permanent magnet member 42 having the inclination angle θ is disposed at the same radial position of the lens barrel 16 with respect to the first permanent magnet member 40, which makes it possible to miniaturize the lens barrel 16 in the optical axis direction.

Although FIG. 14 shows an example in which the second permanent magnet member 42 is inclined, the third permanent magnet member 44 (see FIG. 3) may be inclined similarly to the second permanent magnet member 42. In addition, the third permanent magnet member 44 may be disposed at a different radial position of the lens barrel 16 with respect to the first permanent magnet member 40 as viewed from the cross direction with respect to the optical axis direction, similarly to the second permanent magnet member 42. That is, the center of the third permanent magnet member 44 may be shifted to the radially outward side of the lens barrel 16 with respect to the center of the first permanent magnet member 40.

Figure 15:
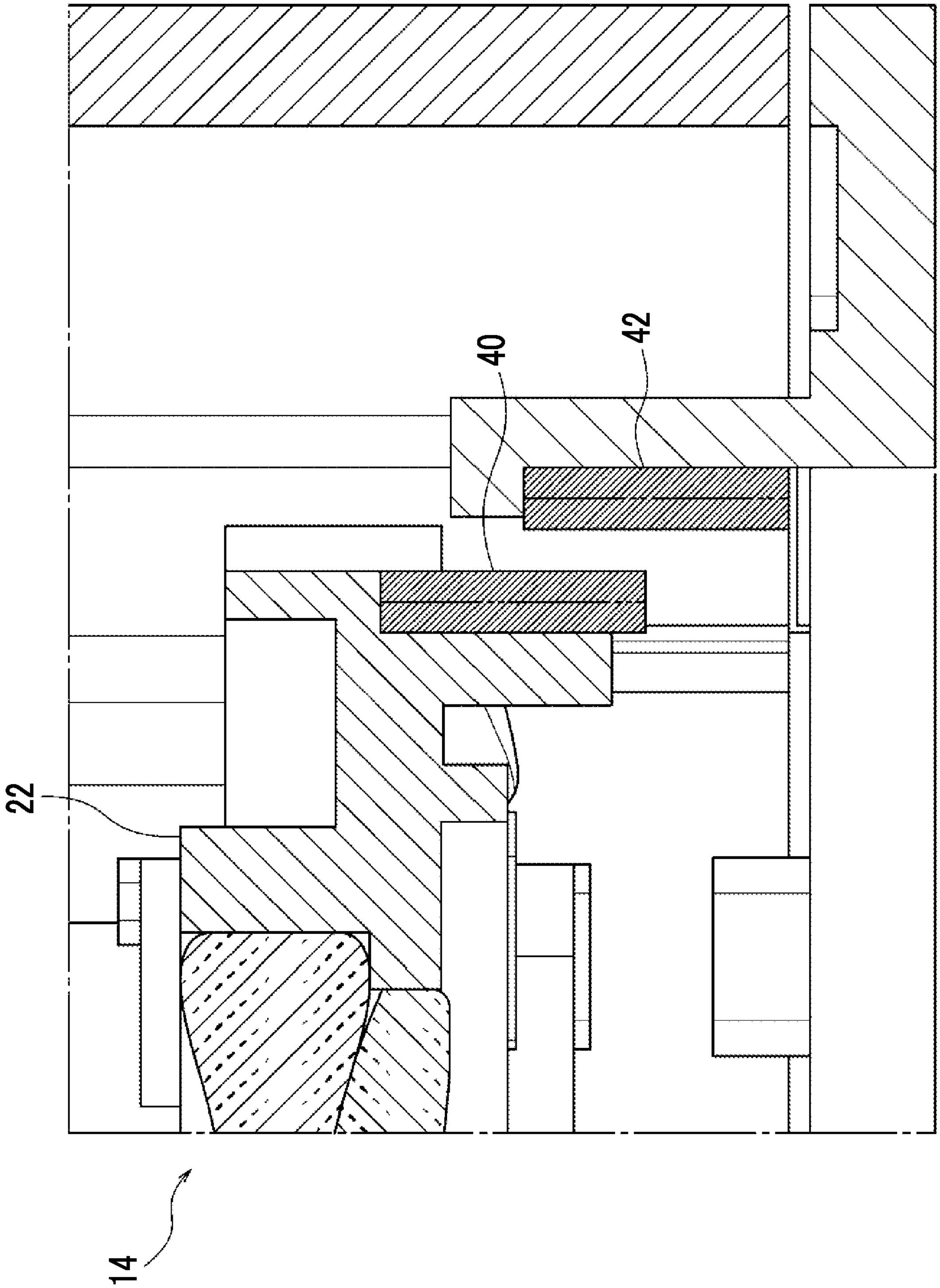
FIG. 15 is a longitudinal sectional view showing a main part of a lens device according to an eighth modification example in an enlarged manner.

FIG. 15 is a longitudinal sectional view showing a main part of the lens device 14 according to an eighth modification example in an enlarged manner. As shown in FIG. 15, in the lens device 14 according to the eighth modification example, the first permanent magnet member 40 and the second permanent magnet member 42 are disposed in orientations facing each other in the radial direction of the lens barrel 16. As an example, the second permanent magnet member 42 is disposed at a position on the radially outward side of the lens barrel 16 with respect to the first permanent magnet member 40.

With this configuration, the first permanent magnet member 40 receives the first repulsive force from the second permanent magnet member 42, whereby the movement of the lens frame 22 due to its own weight can be restricted. In addition, by applying the first repulsive force in the radial direction of the lens barrel 16 to the lens frame 22, a frictional force can be applied between the shaft member 18 and the movement portion 30 (see FIG. 2 for both). As a result, it is possible to increase a braking force with respect to the lens frame 22 as compared with a case where only the first repulsive force in the optical axis direction is applied to the lens frame 22.

Further, the first permanent magnet member 40 and the second permanent magnet member 42 are disposed to face each other in the radial direction of the lens barrel 16, so that it is possible to miniaturize the lens barrel 16 in the optical axis direction as compared with a case where the first permanent magnet member 40 and the second permanent magnet member 42 are disposed to face each other in the optical axis direction.

Although FIG. 15 shows an example in which the first permanent magnet member 40 and the second permanent magnet member 42 are disposed in orientations facing each other in the radial direction of the lens barrel 16, the first permanent magnet member 40 and the third permanent magnet member 44 (see FIG. 3) may be disposed in orientations facing each other in the radial direction of the lens barrel 16.

In addition, the embodiment and the plurality of modification examples described above may be implemented by being appropriately combined.

The contents described and shown above are detailed descriptions of parts related to the technology of the present disclosure and are merely an example of the technology of the present disclosure. For example, the above description related to configurations, functions, actions, and effects is description related to an example of the configurations, functions, actions, and effects of the parts related to the technology of the present disclosure. Therefore, it goes without saying that unnecessary parts may be deleted, new elements may be added, or replacements may be made for the contents described and shown above within the scope that does not depart from the gist of the technology of the present disclosure. Moreover, in order to avoid confusion and facilitate understanding of the parts related to the technology of the present disclosure, description related to common technical knowledge and the like that do not require particular description to enable implementation of the technology of the present disclosure is omitted from the contents described and shown above.

In the present specification, "A and/or B" is synonymous with "at least one of A or B". In other words, "A and/or B"

means that only A may be used, only B may be used, or a combination of A and B may be used. In addition, in description of the present specification, in a case where three or more matters are expressed by "and/or" in combination, the same concept as "A and/or B" is applied.

All documents, patent applications, and technical standards described in the present specification are incorporated by reference into the present specification to the same extent as in a case where the individual documents, patent applications, and technical standards were specifically and individually stated to be incorporated by reference.

Hereinafter, disclosures regarding the present embodiment are provided in the appendix.

APPENDIX 1

The lens device according to the first aspect, in which the first permanent magnet member and the second permanent magnet member are disposed in orientations facing each other in the optical axis direction, and the first permanent magnet member and the third permanent magnet member are disposed in orientations facing each other in the optical axis direction.

APPENDIX 2

The lens device according to the first aspect, in which the first permanent magnet member, the second permanent magnet member, and the third permanent magnet member are arranged along the optical axis direction.

APPENDIX 3

The lens device according to the first aspect, in which the second permanent magnet member and the third permanent magnet member are disposed in orientations in which repulsive forces are generated with respect to the first permanent magnet member.

APPENDIX 4

The lens device according to the first aspect, in which at least any of the first permanent magnet member, the second permanent magnet member, or the third permanent magnet member is formed in a plate-like shape.

APPENDIX 5

The lens device according to the first aspect, in which the first permanent magnet member, the second permanent magnet member, and the third permanent magnet member are formed of any of a metal magnet, a ferrite magnet, or a bonded magnet.

APPENDIX 6

The lens device according to the first aspect, in which the first permanent magnet member, the second permanent magnet member, and the third permanent magnet member are formed of a plastic magnet or a rubber magnet.

APPENDIX 7

The lens device according to the first aspect, in which the drive mechanism includes an actuator that allows the lens frame to move in a non-energized state.

What is claimed is:

1. A lens device comprising:

a lens barrel;

a lens frame that is supported to be movable with respect to the lens barrel in an optical axis direction;

a drive mechanism that moves the lens frame;

a first permanent magnet member that is provided on the lens frame;

a second permanent magnet member that is provided at a first end part of the lens barrel in the optical axis direction;

a third permanent magnet member that is provided at a second end part of the lens barrel in the optical axis direction;

a first contact portion that is provided on the lens frame; and a second contact portion that is provided at the first end part and comes into contact with the first contact portion, wherein the first end part is a part facing the first permanent magnet member in a case where the lens frame is moved to a first movable end part, and the second contact portion is disposed between the first movable end part and the first end part.

2. The lens device according to claim 1, wherein the first permanent magnet member has a first pole receiving a repulsive force from the second permanent magnet member and a second pole receiving a repulsive force from the third permanent magnet member.

3. The lens device according to claim 1, wherein the first end part is a part facing the first permanent magnet member in a case where the lens frame is moved to the first movable end part, and the second end part is a part facing the first permanent magnet member in a case where the lens frame is moved to a second movable end part.

4. The lens device according to claim 1, wherein the second contact portion is disposed at a position where the second contact portion comes into contact with the first contact portion before the first permanent magnet member and the second permanent magnet member come into contact with each other in a case where the lens frame is moved in a direction of the first end part.

5. The lens device according to claim 1, wherein the first contact portion is provided at a part of the lens frame that is different from a part where the first permanent magnet member is provided, and the second contact portion is provided at a part of the first end part that is different from a part where the second permanent magnet member is provided.

6. The lens device according to claim 1, wherein the first contact portion is provided on the first permanent magnet member, and the second contact portion is provided on the second permanent magnet member.

7. The lens device according to claim 1, wherein at least one of the first contact portion or the second contact portion includes a buffering member.

8. The lens device according to claim 1, further comprising:

a third contact portion that is provided on the lens frame; and a fourth contact portion that is provided at the second end part and comes into contact with the third contact portion.

9. The lens device according to claim 8, wherein the third contact portion is provided at a part of the lens frame that is different from a part where the first permanent magnet member is provided, and the fourth contact portion is provided at a part of the second end part that is different from a part where the third permanent magnet member is provided.

10. The lens device according to claim 8, wherein the third contact portion is provided on the first permanent magnet member, and the fourth contact portion is provided on the third permanent magnet member.

11. The lens device according to claim 8, wherein at least one of the third contact portion or the fourth contact portion includes a buffering member.

12. The lens device according to claim 1, wherein, in a case where the lens device is divided into a first region and a second region in a radial direction of the lens barrel as viewed from the optical axis direction, a sensor that detects a position of the lens frame is disposed in the first region, and the first permanent magnet member, the second permanent magnet member, and the third permanent magnet member are disposed in the second region.

13. The lens device according to claim 1, wherein, in a case where a first work amount that is a work amount by a repulsive force of the second permanent magnet member or the third permanent magnet member is denoted by W1, and a second work amount that is a work amount by a gravitational force acting on the lens frame is denoted by W2, $0.5 \leq W1/W2 \leq 1.5$ is satisfied.

14. The lens device according to claim 1, wherein the first permanent magnet member and the second permanent magnet member are disposed in orientations facing each other in a radial direction of the lens barrel, and the first permanent magnet member and the third permanent magnet member are disposed in orientations facing each other in the radial direction.

15. An imaging apparatus that includes the lens device of claim 1.

16. A lens device comprising:

a lens barrel;

a lens frame that is supported to be movable with respect to the lens barrel in an optical axis direction;

a drive mechanism that moves the lens frame;

a first permanent magnet member that is provided on the lens frame;

a second permanent magnet member that is provided at a first end part of the lens barrel in the optical axis direction;

a third permanent magnet member that is provided at a second end part of the lens barrel in the optical axis direction;

a third contact portion that is provided on the lens frame; and a fourth contact portion that is provided at the second end part and comes into contact with the third contact portion, wherein the fourth contact portion is disposed at a position where the fourth contact portion comes into contact with the third contact portion before the first permanent magnet member and the third permanent magnet member come into contact with each other in a case where the lens frame is moved in a direction of the second end part.

17. An imaging apparatus that includes the lens device of claim 16.

18. A lens device comprising:

a lens barrel;

a lens frame that is supported to be movable with respect to the lens barrel in an optical axis direction;

a drive mechanism that moves the lens frame;

a first permanent magnet member that is provided on the lens frame;

a second permanent magnet member that is provided at a first end part of the lens barrel in the optical axis direction; and a third permanent magnet member that is provided at a second end part of the lens barrel in the optical axis direction, wherein, in a case where the lens device is divided into a first region and a second region in a radial direction of the lens barrel as viewed from the optical axis direction, a sensor that detects a position of the lens frame is disposed in the first region, and the first permanent magnet member, the second permanent magnet member, and the third permanent magnet member are disposed in the second region, and wherein the drive mechanism includes a first drive mechanism, and a second drive mechanism disposed on a side opposite to the first drive mechanism as viewed from the optical axis direction, and the first region and the second region are regions divided by a line connecting the first drive mechanism and the second drive mechanism as viewed from the optical axis direction.

19. An imaging apparatus that includes the lens device of claim 18.

20. A lens device comprising:

a lens barrel;

a lens frame that is supported to be movable with respect to the lens barrel in an optical axis direction;

a drive mechanism that moves the lens frame;

a first permanent magnet member that is provided on the lens frame;

a second permanent magnet member that is provided at a first end part of the lens barrel in the optical axis direction; and a third permanent magnet member that is provided at a second end part of the lens barrel in the optical axis direction, wherein the second permanent magnet member and/or the third permanent magnet member is inclined with respect to the optical axis direction as viewed from a cross direction with respect to the optical axis direction.

21. The lens device according to claim 20, wherein the second permanent magnet member and/or the third permanent magnet member is disposed at a different radial position of the lens barrel with respect to the first permanent magnet member as viewed from the cross direction.

22. The lens device according to claim 20, wherein an inclination angle of the second permanent magnet member and/or the third permanent magnet member with respect to the optical axis direction is 45 degrees or more and less than 90 degrees.

23. The lens device according to claim 20, wherein the second permanent magnet member and/or the third permanent magnet member is inclined with respect to the optical axis direction at an inclination angle at which a first repulsive force component in the optical axis direction and a second repulsive force component in a radial direction of the lens barrel are generated with respect to the first permanent magnet member.

24. An imaging apparatus that includes the lens device of claim 20.

* * * * *